United States Patent [19]

Miyamoto et al.

[11] Patent Number: 5,559,571
[45] Date of Patent: Sep. 24, 1996

[54] LENS BARREL AND ELECTRIC CIRCUIT BOARD CONNECTION STRUCTURE

[75] Inventors: Hidenori Miyamoto, Chiba-ken; Minoru Kato; Junichi Omi, both of Kanagawa-ken; Isao Soshi, Tokyo; Yoshio Imura, Kanagawa-ken, all of Japan

[73] Assignee: Nikon Corporation, Tokyo, Japan

[21] Appl. No.: 375,686

[22] Filed: Jan. 20, 1995

[30] Foreign Application Priority Data

Jan. 20, 1994 [JP] Japan .................................. 6-004888
Jan. 27, 1994 [JP] Japan .................................. 6-023604
Feb. 4, 1994 [JP] Japan .................................. 6-032054

[51] Int. Cl.$^6$ ................................................. G03B 17/00
[52] U.S. Cl. ................................. 354/286; 354/195.1
[58] Field of Search ........................... 354/286, 195.1, 354/195.11, 195.12, 485, 202, 400, 233

[56] References Cited

U.S. PATENT DOCUMENTS

| | | | |
|---|---|---|---|
| 4,359,277 | 11/1982 | Shimizu et al. | 354/202 X |
| 4,711,548 | 12/1987 | Arakawa et al. | 354/485 |
| 4,864,348 | 9/1989 | Fujiwara et al. | 354/286 X |
| 4,922,274 | 5/1990 | Yamamoto et al. | 354/271.1 |
| 4,999,656 | 3/1991 | Shimizu et al. | 354/286 X |
| 5,012,273 | 4/1991 | Nakamura et al. | 354/485 |
| 5,051,764 | 9/1991 | Nomura et al. | 354/195.1 |
| 5,192,964 | 3/1993 | Shinohara et al. | 354/202 |
| 5,461,443 | 10/1995 | Nakayama et al. | 354/286 X |

FOREIGN PATENT DOCUMENTS 6-3727  1/1994  Japan .

*Primary Examiner*—D. Rutledge
*Attorney, Agent, or Firm*—Oliff & Berridge

[57] ABSTRACT

A shake-prevention mechanism is positioned on a support unit that supports the shake-prevention optical system. A single flexible printed circuit board having connection ends that connect to the various electrical connections is used as the wiring device to interconnect to the various electrical connections in the mechanism in addition to connecting the mechanism to external devices. The connection ends of the flexible printed circuit board are mounted to pinch and/or surround the support unit containing the drive mechanism from the front and back in the direction of the optical axis. Additionally, a base plate and a cover unit are positioned to have a spacing in between, together forming a support unit for supporting a shake-prevention optical system that is part of the shooting lens system. One photo-interrupter is fixed to the base plate that supports the motor, while another photo-interrupter is fixed to the cover unit that presses the motor and is a unit separate from the base plate. A shutter unit is integrated with a lens group with a smaller diameter than the anti-vibration lens group. The shutter wiring board and the anti-vibration wiring board are connected electrically in a surface substantially perpendicular to the optical axis formed in the vicinity of a lens group of the shutter unit.

26 Claims, 20 Drawing Sheets

LENS BARREL AND ELECTRIC CIRCUIT BOARD CONNECTION STRUCTURE

FIELD OF THE INVENTION

The present invention relates to a lens barrel in which electrical components having electrical connections are positioned to the: front and back of a support unit that supports a lens group capable of movement in the direction of the optical axis and, in particular, this invention relates to a structure with a flexible printed circuit board (hereinafter referred to as an FPC board) so that electrical connections at the front and back of the support unit are electrically connected through the FPC board.

The present invention also relates to a lens barrel wherein a shake-prevention device or the like is used to prevent image shaking caused by shaking in a camera or the like and, in particular, to a structure containing detection devices such as photo-interrupters and a drive source such as a motor.

BACKGROUND OF RELATED ART

Inside a lens barrel, various electrical control mechanisms are provided such as, for example, a shutter drive mechanism, a focusing motor, a zooming motor and a shake-prevention mechanism. An FPC board, which comprises a flexible printed circuit board, is used to electrically connect the control mechanisms with control circuits and electric components outside the lens barrel.

This type of FPC board has one end connected to the circuit boards within the lens barrel where the electric components are mounted, while the other end is connected to circuit boards provided outside the lens barrel (where control circuit components such as control ICs are mounted) after the FPC board is wired by being bent several times around the space inside the lens barrel. Accordingly, electrical components in the mechanism inside the lens barrel and electrical components outside the lens barrel are electrically connected via wire patterns on the FPC board.

When this type of FPC board is used, the FPC board can respond through suitable deformation to movement in the direction of the optical axis by the electrically controlled mechanisms having electrical components, accompanying movement of a lens group such as the zooming lens, and thus, the FPC board does not place an undue burden on the lens group.

However, when an attempt is made to connect this kind of electrically controlled mechanism within the lens barrel to other mechanisms within the lens barrel or to electrical components outside the lens barrel using the FPC board, the following problems arise.

The electrically controlled mechanisms are supported by the optical system support unit that is supported inside the lens barrel so as to be capable of movement, but there are many limiting conditions on the arrangement of electrical connections in these mechanisms when the mounting and arrangement within the lens barrel of the FPC board used as a wiring device are taken into consideration. In particular, placing all of the electrical connections of the mechanisms contained in the support unit at one side of the support unit is structurally impossible.

In addition, when an attempt is made to expose electrical connections on both sides of the support unit and to connect each of these through FPC boards, a plurality of FPC boards must be used due to the positional relationship of the connections and the wiring connection structure. Moreover, the number of wiring patterns on these circuit boards must be increased, making it necessary to formulate countermeasures such as connecting these with wires at suitable locations.

Consequently, with the conventional structure there are real problems and difficulties in terms of the number of FPC boards and in wiring the structure, as well as in connecting the various connecting ends of the FPC boards to the connections on the mechanisms, and there are also problems in terms of ease of assembly, assembly cost and production costs. In addition, space is also necessary for the connections of the FPC boards and for the mounting of each of the FPC boards, creating the problem that it becomes impossible to make the lens barrel, and the camera as a whole, compact.

In particular, when a plurality of FPC boards are used and each of these is connected with wiring at the appropriate location, it is also necessary to ensure beforehand that each board is connected to the mechanisms. Accordingly, assembly becomes difficult, and the wiring becomes more complicated. This creates the need for countermeasures that solve these problems.

In addition, various components such as the automatic exposure mechanism and automatic focus mechanism have been made electronic and have been largely automated. However, one area that has remained inadequate in attempting this kind of automation in cameras is that of measures to counteract image shaking caused by camera shaking, for example, which is produced during hand held photography.

For this reason, a shake-prevention device has been proposed for this type of camera to prevent image shaking caused by the shaking of the camera during photography, such as by inclining or vibrating the camera. Prevention is effected by detecting camera shake conditions using a shake detection device, by providing the shooting lens system (main optical system) or a part of the optical system with a shake-prevention optical system (hereinafter referred to as the shake-prevention lens), and by causing this system to shift in a direction perpendicular to the optical axis.

In addition, various electrical drive mechanisms are positioned inside the lens barrel of the above-described camera, such as, for example, drive mechanisms including the shutter drive mechanism, the focusing motor and the zooming motor.

Furthermore, it is necessary to conduct rotational drive position detection on the drive mechanisms thus contained inside the above-described lens barrel, for which reason sensors such as photo-interrupters are generally also contained within the lens barrel.

However, with the above-described electrical drive mechanism, the mounting structure of the motor, which comprises the drive source, is a problem. In addition, the mounting structure of the pair of photo-interrupters, which are included as rotation detection sensors, also presents a problem, as does the motor.

In other words, a problem exists with the conventional structure in that the structure is complex and assembly is also complicated. Furthermore, with the above-described structure, because assembly of the various components is complicated, a problem also exists in that maintenance is difficult, and assembly and removal of the components is troublesome.

In particular, with the described conventional structure, it is necessary to use a unit having a complex shape as the support unit that serves as a base for the mechanism where the various components are provided, making the production processes troublesome, and making it difficult to simply mold the unit, creating problems in terms of cost. It is thus desirable to create countermeasures to overcome these problems.

Heretofore, the mounting circuit board anchored on a camera body and the electric components within the lens barrel in the electric circuit boards of a camera have been connected by a piece of FPC (flexible print circuit board). (See, for example, Japanese Laid Open Patent Application No. 3-160594.) In such a camera, the shutter unit and the focus unit are placed inside the camera and are usually integrated as one unit; thus, electric components are located in one place, making it easier to connect the FPC.

However, in order to realize higher functionality, a super compact size, and better cost effectiveness, innovations such as the introduction of anti-vibration components to prevent shaking inside the lens barrel, and a structure in which the shutter unit and the focus unit are separated, have been implemented in recent cameras.

Because of such innovations, more electric components became necessary inside the lens barrel. Moreover, it has become impossible to place all of the electric components in one place, and the FPC has become more complicated in structure.

Moreover, it has become impossible to connect all the electric components with one FPC. Although it is possible to provide a second FPC to be connected to the conventional (first) FPC, this requires space to connect the first FPC and the second FPC, presenting yet another obstacle in making a camera super compact.

SUMMARY OF THE INVENTION

In consideration of the foregoing, it is a first object of the present invention to formulate a mounting structure for an FPC board that is connected to electrical mechanisms such as shake-prevention mechanisms mounted on the optical system support unit in the lens barrel, to simplify the structure of each of these components, to improve the ease of assembly, to reduce costs, and to obtain a lens barrel that enables both the lens barrel and the camera as a whole to be made more compact.

It is a second object of the present invention to provide a lens barrel in which the mounting structure containing the drive mechanism such as the shake-prevention mechanism in a lens barrel is improved, ease of assembly is improved and costs are reduced.

A third object of the present invention is to provide an electric circuit board connection structure for a camera with effective space usage that solves the problems described above and that realizes higher functionality, a super compact size, and better cost effectiveness.

In order to achieve the first object and other objectives, a first aspect of the present invention provides an optical system having at least part of the main optical system; a support unit that supports this optical system; an electrical mechanism positioned as part of the support unit and has electrical connections both to the front and the back in the direction of the optical axis in the support unit; and a wiring device that connects the various electrical connections in the electrical mechanism and connects the connections to external devices. A single flexible printed circuit board having connecting ends to connect to the various electrical connections is used as the wiring device, and the connecting ends of the flexible printed circuit board are mounted to pinch the support unit that contains the electrical mechanism from both the front and back in the direction of the optical axis.

A second aspect of the present invention includes a shake-prevention optical system having at least part of the main optical system; a support unit that supports this shake-prevention optical system; a shake-prevention mechanism positioned as part of this support unit and having electrical connections both to the front and the back in the direction of the optical axis in the support unit; and a wiring device that is connected to the various electrical connections in the shake-prevention mechanism and that is used to connect these connections to the outside. A single flexible printed circuit board having connecting ends to connect to the various electrical connections is used as the wiring device, and the connecting ends of the flexible printed circuit board are mounted to pinch the support unit that contains the shake-prevention mechanism from both the front and back in the direction of the optical axis.

The lens barrel according to the second aspect of the present invention may include a device wherein the shake-prevention mechanism comprise a first and second drives that drive the shake-prevention optical system in first and second directions, each of these drives being equipped with a first and a second motor with the output shaft of each being positioned so as to be parallel to the first and second directions, respectively; first and second light-shielding plates that are provided either directly or indirectly on the output shaft of each of these motors and that form a light-shielding unit with a certain spacing in the direction of the circumference; and two pairs of photo-interrupters that are provided at two different positions facing each other along the direction of the circumference of each of the light-shielding units, and that detect the drive position of the shake-prevention optical system. The first and second motors and the electrical connections of the two pairs of photo-interrupters may be provided on the front and back sides of the support unit in the direction of the optical axis; and the single flexible printed circuit board having connecting ends that are electrically connected to the electrical connections is mounted so as to pinch the support unit from the front and back.

With the present invention, electrical mechanisms may be provided on the support unit that supports the optical system, a single FPC board being mounted so as to pinch the support unit from the front and back in the direction of the optical axis to connect with the electrical connections of the mechanisms provided on the front and back sides of the support unit in the direction of the optical axis, the FPC board being pulled out in one direction parallel to the direction of the optical axis.

In addition, with the present invention, shake-prevention mechanisms may be provided on the support unit that supports the shake-prevention optical system, a single FPC board being mounted to pinch this support unit from the front and back in the direction of the optical axis so as to connect with the electrical connections of the shake-prevention mechanisms provided on the front and back sides of the support unit in the direction of the optical axis, the FPC board being pulled out in one direction parallel to the direction of the optical axis.

Furthermore, with the present invention, the connecting ends of the FPC board are electrically connected to the electrical connections of a pair of photo-interrupters, first and second motors being provided to the front and back (in the direction of the optical axis) of the support unit on which the shake-prevention mechanisms are mounted, by which means the FPC board is mounted so as to pinch the support unit from the front and the back.

In order to accomplish the second objective, the lens barrel according to a third aspect of the present invention includes an electrical drive mechanism containing a rotation transmission device and a drive motor positioned on a unit that supports at least part of the main optical system. The drive mechanism is equipped with a pair of rotation detection sensors that are provided in order to control rotation of a power motor, the pair of rotation detection sensors being affixed to separate units that comprise the drive mechanism.

The lens barrel according to a fourth aspect of the present invention includes a shake-prevention optical system that prevents shakes and a drive mechanism containing a rotation transmission device and a power motor that drives the shake-prevention optical system. A pair of rotation detection sensors used to detect the rotation of the power motor in order to conduct drive detection of the shake-prevention optical system is affixed to the separate units that comprise the drive mechanism.

Furthermore, the lens barrel according to the fourth aspect of the present invention may comprise a base unit and a cover unit that are integrally attached opposite each other with a spacing in the direction of the optical axis so that the drive mechanism can be positioned therebetween; wherein one of the pair of rotation detection sensors is fixed to the base unit that supports the power motor, and the other rotation detection sensor is fixed to the cover unit that presses the power motor.

In addition, the lens barrel according to the fourth aspect of the present invention may be a device wherein two photo-interrupters are used as the pair of rotation detection sensors, the photo-interrupters being provided to be in two different positions along the circumference of a single light-shielding plate having a light-shielding unit at a certain spacing in the direction of the circumference and that are rotationally driven by the rotation of the power motor.

With the present invention, it is possible to improve the ease of assembly by having the motors that include the drive sources for the shake-prevention optical system that prevents shakes and a pair of photo-interrupters that serves as the rotation detection sensors to detect rotation of the motors, and by attaching these separately to the cover unit that presses the motor and to the base unit that supports the motor and which together comprise the support unit for the shake-prevention optical system comprising the drive mechanism.

In addition, with the present invention it is possible to remove the cover unit without removing the flexible printed circuit board from the base board because the pair of photo-interrupters is attached to separate units, thereby making maintenance easier and also improving ease of assembly. Furthermore, because the base board and the cover unit are attached separately, at least the configuration of the base board or the configuration of the cover unit to which the pair of photo-interrupters is attached does not become complicated, thereby making production processes easier, making molding of the units simpler and lowering molding costs.

In order to achieve the third object of the invention, a fifth aspect of the present invention provides an electric circuit board connection structure in a camera for a camera including a multiplicity of lens groups placed within a lens barrel, a lens unit supporting each of the lens groups, a first wiring circuit board placed between the lens barrel and an electric circuit board provided in a camera body, and a second wiring board placed within the lens barrel, wherein the first wiring board and the second wiring board are connected in the vicinity of a lens group with a smaller diameter among the lens groups. The first wiring board and the second wiring board may be connected electrically in a surface perpendicular to the optical axis of the lens unit.

A sixth aspect of the invention provides an electric circuit board connection structure in a camera for a camera including a multiplicity of lens groups placed within a lens barrel, a lens unit to support each of the lens groups, a first wiring board placed between the lens barrel and an electric circuit board provided in the camera body, and a second wiring board and a third wiring board placed within the lens barrel, wherein the second wiring board and the third wiring board are connected in the vicinity of a lens group with a smaller diameter among the lens groups. The second wiring board and the third wiring board may be connected electrically in a surface perpendicular to the optical axis of the lens unit.

A seventh aspect of the present invention includes an electric circuit board connection structure in a camera for a camera including an anti-vibration unit having anti-vibration lens groups within a lens barrel, a shutter unit integrated in the lens group with a smaller diameter than the diameters of the anti-vibration lens groups, a shutter wiring board to connect an electric circuit board provided in the camera body and the electric components in the shutter unit, and an anti-vibration wiring board to connect the electric components of the anti-vibration unit. The shutter wiring board and the anti-vibration wiring board are connected electrically in a surface substantially perpendicular to the optical axis of the shutter unit.

With the present invention, wiring boards may be connected to each other in the vicinity of the lens group having the smaller radius among the multiplicity of the lens groups, connection being possible without providing a special space. In this case, if the connection is made electrically in the surface perpendicular to the optical axis that is formed inside the lens unit, and as the diameter of the lens group becomes smaller, the effective perpendicular surface for electric board connection becomes larger. In other words, because there is a certain amount of space between lens groups due to the structure of the lenses, a small amount of space will be provided between lens units that support lens groups. Moreover, a vertical surface relative to the optical axis exists in the space,, electrical connection being performed using the vertical surface.

Because connection is accomplished using this vertical surface, a large flat space is usable, enabling a large number of connections. Furthermore, the large flat surface allows for easier execution of soldering and other work.

BRIEF DESCRIPTION OF THE DRAWINGS

The preferred embodiments will be described in conjunction with the following drawings in which like reference numerals designate like elements and wherein.

DETAILED DESCRIPTION OF PREFERRED EMBODIMENTS

Figure 1:
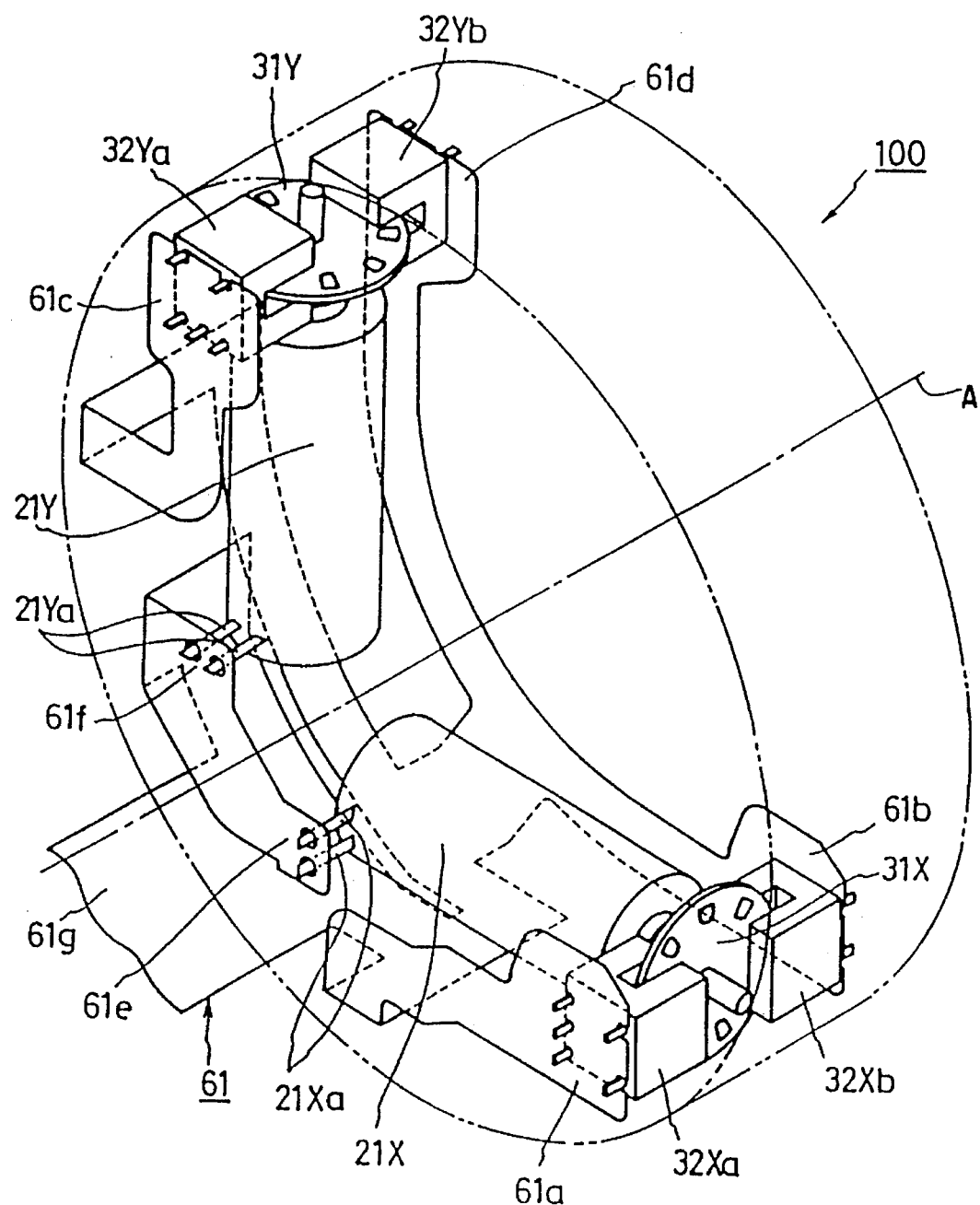
FIG. 1 is an oblique perspective view that shows the shake-prevention mechanism and the FPC board mounted thereon in a embodiment of the lens barrel according to the present invention.
Figure 1:
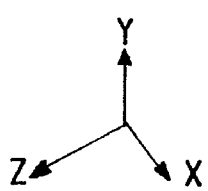
Figure 2:
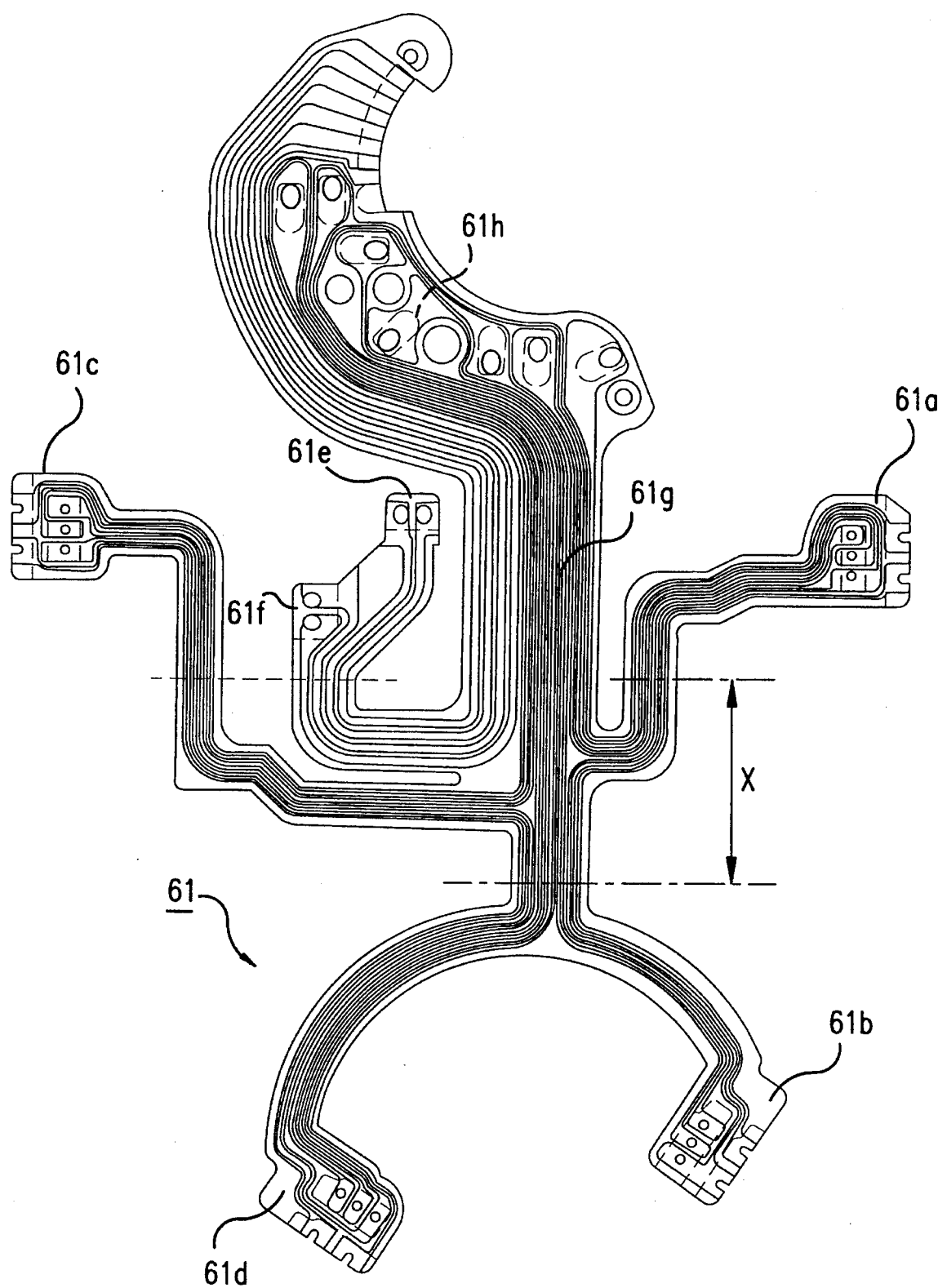
FIG. 2 is a developmental view of the FPC board showing an embodiment of the lens barrel according to the present invention.
Figure 3:
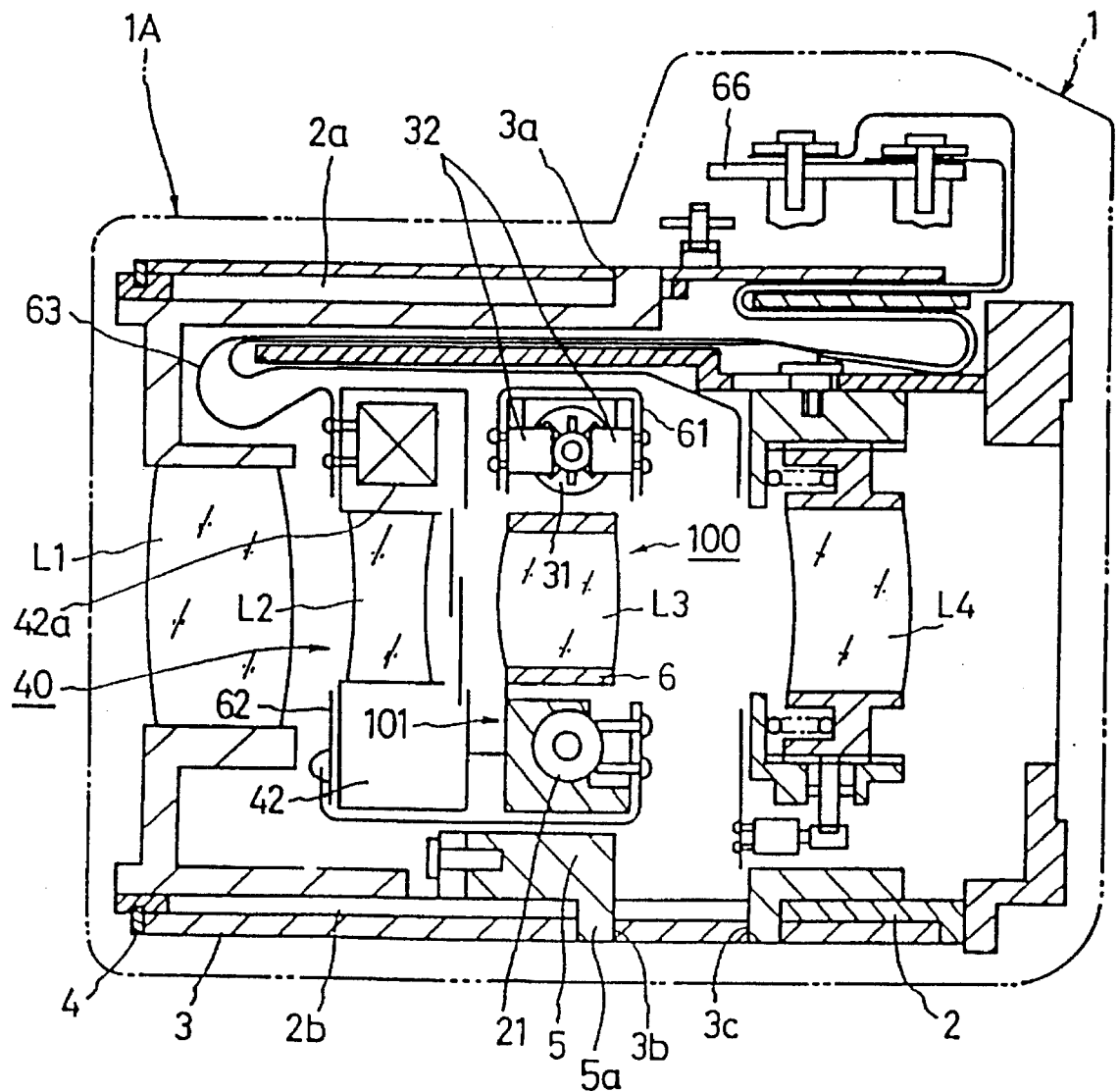
FIG. 3 is a cross-sectional view of the entire camera that shows the configuration when the lens barrel is at the wide-angle position in an embodiment of the lens barrel according to the present invention.
Figure 4:
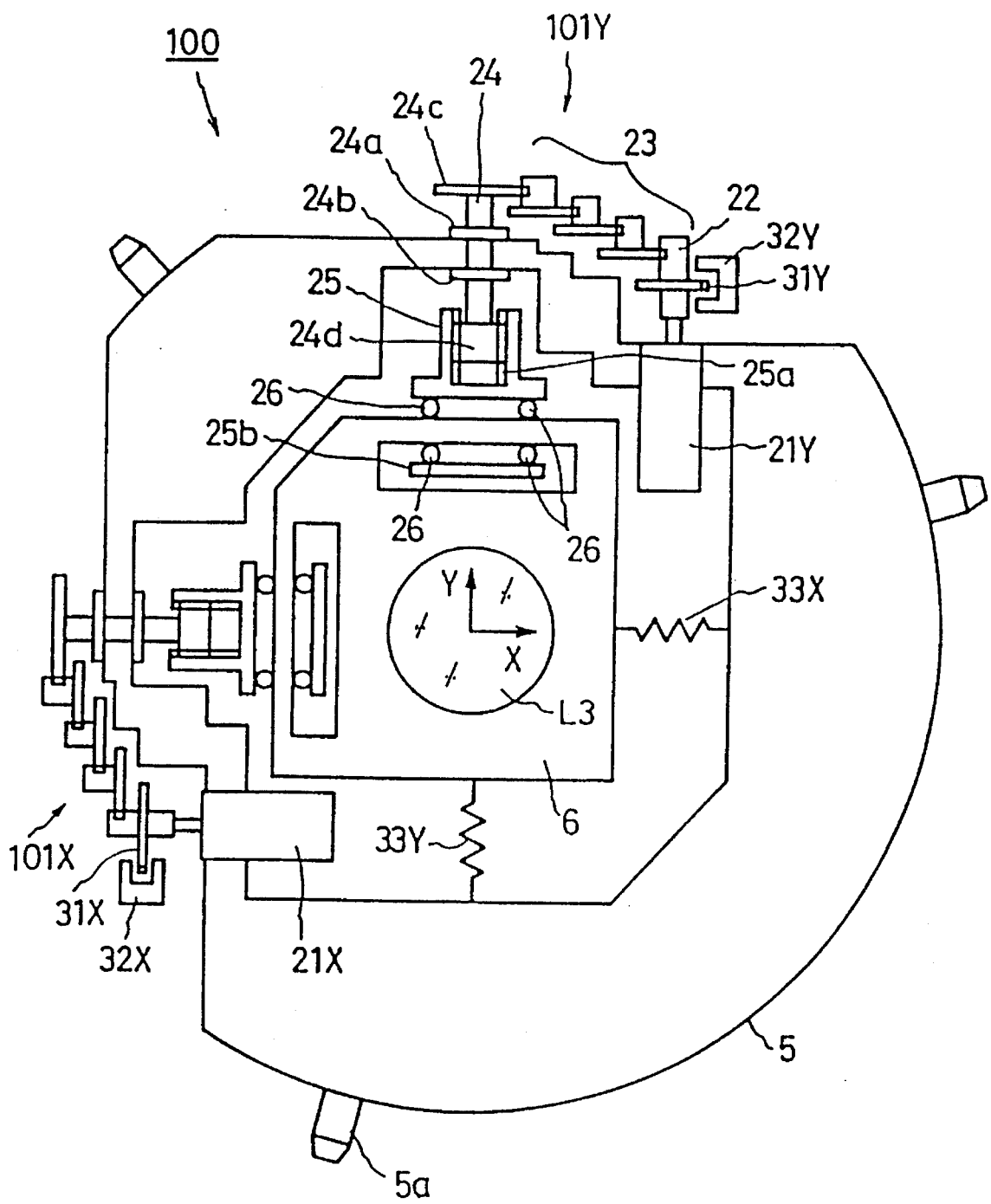
FIG. 4 is a diagram that shows the basic structure of the shake-prevention mechanism in an embodiment of the lens barrel according to the present invention.

FIGS. 1 to 4 show an embodiment of a lens barrel according to the present invention, in which an example is shown of this embodiment wherein the present invention is applied to a camera with an integrally attached lens barrel (a zoom camera), as shown in FIGS. 3 and 4.

Figure 15:
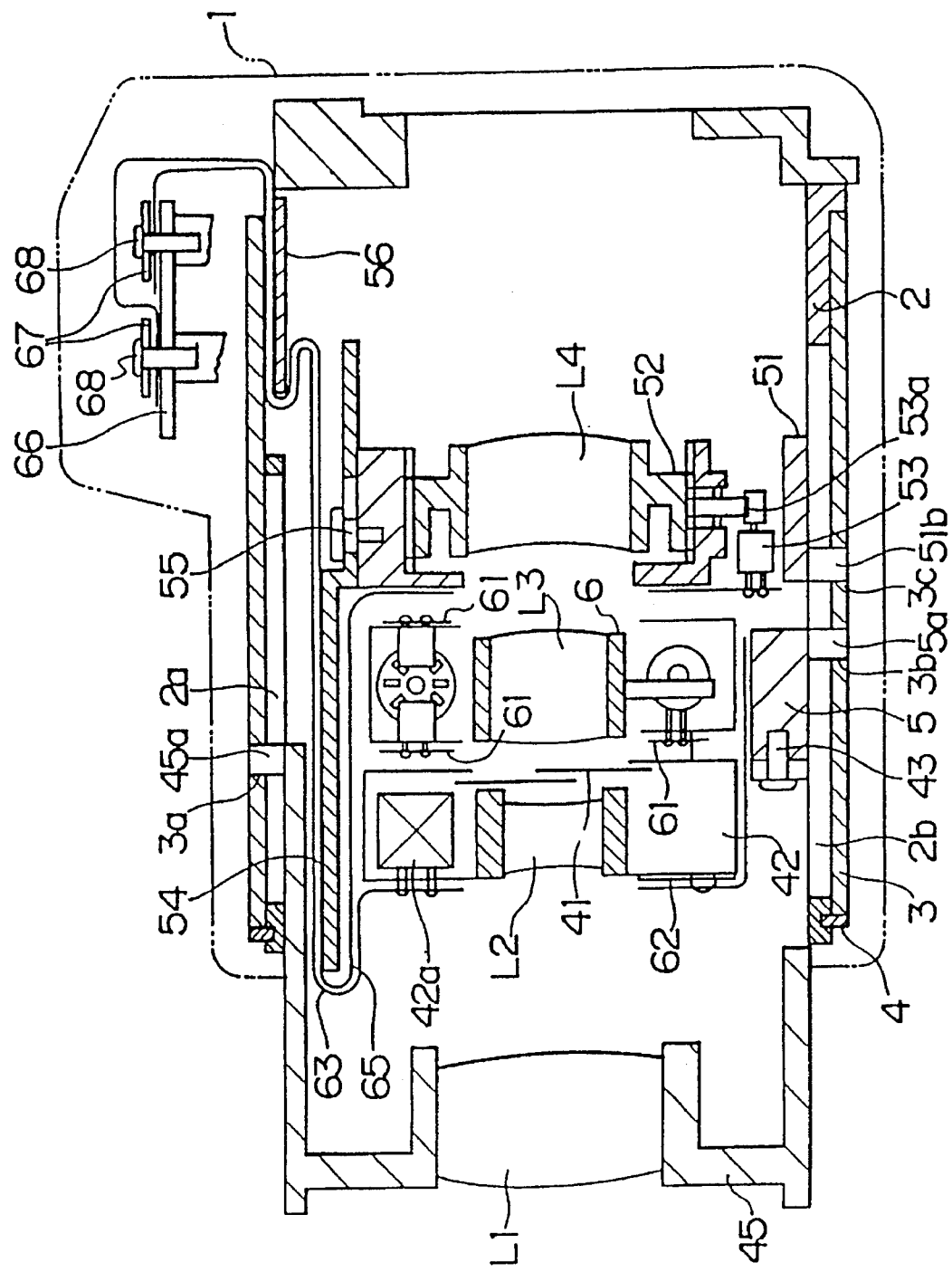
FIG. 15 is a side cross-section (condition in which the lens barrel is in the telephoto position) showing a lens barrel integrated camera (zoom camera) in the present invention.

In FIG. 3, the amount of protrusion of the lens barrel 1A from the camera body 1 at the time of photography is at a minimum, the so-called wide-angle position, and although not shown in the diagram, the lens barrel 1A is capable of protruding toward the front of the camera body 1 in a well-known manner to reach the telephoto position (see, for example, FIG. 15).

Initially, the basic structure of the camera body will be briefly described with-reference to FIG. 3. A fixed lens barrel 2 comprises the part of the lens barrel 1A that is fixed to the camera body 1, and linear grooves 2a and 2b are formed along the circumference of the fixed lens barrel 2 in the direction of the optical axis. In addition, a cam barrel 3 is mounted along the outside circumference of the fixed lens barrel 2 so as to be capable of rotation and anchored by a ring 4. Cam grooves 3a, 3b and 3c are formed along the circumference of the cam barrel 3.

Inside the cam barrel 3 and the fixed lens barrel 2, lens groups L1, L2, L3 and L4, which form an optical system comprising the photography optical system, are supported in the required state. Of these lens groups, L3 is the lens group that comprises the shake-prevention optical system (hereinafter referred to as the shake-prevention lens).

On the inside surface of the fixed lens barrel 2 is a lens base 5 that comprises the support unit for the shake-prevention lens L3, and a shake correction device 100 that comprises the shake-prevention mechanism is mounted on the base 5. A cam pin 5a is inserted into the cam groove 3b so that the shake-prevention mechanism (the shake correction device 100) is capable of movement in the direction of the optical axis.

The shake correction device 100 includes a shake-prevention lens group (hereinafter, the shake-prevention lens) L3, which is supported by the lens holder 6, and a shake correction drive mechanism 101 that drives the shake-prevention lens L3.

A shake-prevention flexible printed circuit board (hereinafter, shake-prevention FPC board 61 or simply FPC board) is attached to the shake correction device 100, and electrical components that comprise the shake correction device 100 (the X and Y direction drive motors (21X and 21Y) and the various photo-interrupters 32 (32X and 32Y)) are also mounted.

In addition, the bottom part of the shake-prevention FPC board 61 is pulled out toward the front of the camera along the direction of the optical axis through a hole provided in the lens base 5 and is connected by soldering or the like to a mounting plate 62 provided on the left surface in the drawing (front surface) of a lens shutter mechanism 40.

Electrical components 42a in the shutter drive unit 42 are connected by soldering to the mounting plate 62. The end 63 of a shutter mechanism FPC board is used to connect the electrical components 42a to a driver outside the lens barrel 1A and is also connected to the mounting plate 62. The other end of the shutter mechanism FPC board 63 is connected at the top of the camera body 1 to a control device 66 that controls the operations of the camera.

FIG. 4 is a perspective view of the drive mechanisms 101X and 101Y in the shake correction device 100. The device includes an X-direction drive mechanism 101X that drives the shake-prevention lens L3 in the X direction, and a Y-direction drive mechanism 101Y that drives the shake-prevention lens L3 in the Y direction. In this instance, both the X direction and the Y direction are directions perpendicular to the optical axis of the shooting lens system.

The Y-direction drive mechanism 101Y contains a Y-direction motor 21Y; a gear 22, which rotates integrally with the output shaft of motor 21Y; a reduction gear train 23, which reduces the rotation of gear 22; a Y-direction shift drive shaft 24, which is linked to the gear train 23; and a Y-direction drive arm 25, which changes the rotation of the drive shaft 24 into linear motion.

The Y-direction shift drive shaft 24 is rotatably mounted on the base 5 by a pair of brushes or flanges 24a and 24b, the top end of the shaft being linked to a gear 24c that fits together with the final gear in the reduction gear train 23, while on the bottom of the shaft is a male screw 24d. In addition, the Y-direction drive arm 25 is held in a space formed on the base 5 so as to be capable of rising and falling as well as being capable of rotation, and the above-described male screw end 24d of the drive shaft 24 fits into a female screw end 25a formed on the top of the drive arm.

Furthermore, a pinching component 25b is formed at the bottom end of the Y-direction drive arm 25, the top connection of the lens holder 6 being held by the pinching component 25b via four slider balls 26.

Accordingly, the lens holder 6, i.e. the shake-prevention lens L3, is shifted in the direction of the Y axis with the rise and fall of the drive arm 25. The amount of this shift depends on the amount of rotation of the motor 21Y.

The X-direction drive mechanism 101X has the same composition as the Y-direction drive mechanism 101Y, so that the shake-prevention lens L3 can be shifted in the direction of the X axis.

A photo-interrupter 32X on the X axis side is used to detect the amount of movement in the direction of the X axis. A reference number 21X designates an X-direction drive motor, and reference numbers 33X and 33Y designate springs that apply a spring force to the lens holder 6 in the direction of the X axis and Y axis.

The gear 22, which rotates integrally with the output shaft of the Y-direction motor 21Y, is provided with a disk 31Y as a light-shielding plate that forms a light-shielding component having a plurality of holes formed in concentric circles with a predetermined spacing between the holes around the circumference, the disk 31Y being rotatable as an integral unit. A reference number 31X designates the disk on the X axis side.

Furthermore, a commonly-known photo-interrupter 32Y contains a light-receiving component and a light-emitting component and surrounds the part of the disk 31Y containing the holes. The photo-interrupter 32Y outputs a pulse signal each time a hole in the disk 31Y is detected. Furthermore, by counting the number of pulses, it is possible to detect the amount of rotation of the motor 21Y (which depends on the shift amount of the shake-prevention lens L3). A similar disk 31X and photo-interrupter 32X are also provided on the side of the X-direction motor 21X so that the amount of rotation of the motor 21X is detected.

In FIG. 4, one each of the photo-interrupters 32X and 32Y are shown in each of the X and Y directions, but in actuality, two photo-interrupters (32Xa, 32Xb and 32Ya, 32Yb) are provided facing each other in each direction, as shown in FIGS. 1 and 3. The reason for using two photo-interrupters in each direction is to detect the direction of movement in addition to the amount of movement of the shake-prevention lens L3. This kind of detection of movement can be accomplished by positions detected by each of the photo-interrupters 32Xa, 32Xb, 32Ya and 32Yb being shifted in the direction of circumference.

FIG. 1 shows an embodiment of a lens barrel according to the present invention, and also shows the mounting structure of the shake-prevention FPC board 61 relative to the shake correction device 100, which comprises the shake-prevention mechanism. Only the basic elements relating to the mounting structure are shown in FIG. 1, and the dot-and-dash lines in the drawing indicate the outline shape of the support unit that comprises the shake correction device (shake-prevention mechanism) 100.

The X-direction motor 21X and the Y-direction motor 21Y are indicated in FIG. 1, and two photo-interrupters 32Xa, 32Xb, 32Ya and 32Yb in each direction are provided to detect the holes in the disks 31X and 31Y mounted as integral units on the output shaft of each motor. The reduction gear train, the lens and the like have been omitted from the drawing for clarity.

Furthermore, each of the basic elements that comprise the drive mechanisms 101X and 101Y of the shake correction device 100 (shake-prevention mechanism) are connected to the shake-prevention FPC board 61 as is clear from FIGS. 1 and 2.

In other words, photo-interrupter 32Xa in the X direction is attached preferably by soldering to the connection end 61a of the shake-prevention FPC board 61, and the other three photo-interrupters 32Xb, 32Ya and 32Yb are each similarly connected preferably by soldering to connection ends 61b, 61c and 61d, respectively, of the shake-prevention FPC board 61. Terminals 21Xa and 21Ya of the X-direction motor 21X and the Y-direction motor 21Y are also connected by soldering to the connection ends 61e and 61f, respectively, of the shake-prevention FPC board 61. The mounting board 62 attached to the left surface (front surface) of the lens shutter mechanism 40 in FIG. 3 is also connected to this board 61 by soldering at the extension of component 61g. In this manner, the shake-prevention FPC board 61 is mounted so as to pinch the shake correction device 100 (shake-prevention mechanism) from the front and back in the direction of the optical axis A.

The developmental configuration of the shake-prevention FPC board 61 of the present embodiment is shown in FIG. 2. By bending FPC board 61 at the positions indicated by the dashed lines in the drawing, and running the board along the outline shape of the shake-prevention mechanism (i.e., the lens base 5, which is a support unit that contains the shake correction device 100), the mounting structure shown in FIGS. 1 and 3 can be attained wherein the FPC board pinches the shake-prevention mechanism 100 from the front and back in the direction of the optical axis A from the outside.

In addition, with the FPC board 61, the component 61h of the extension of the component 61g is connected by soldering to the mounting plate 62. Furthermore, the dimension x in FIG. 2 is a spacing equivalent to the thickness of the support unit, which comprises the above-described shake-prevention mechanism 100.

With the lens barrel 1A of the present invention, various connections provided on a single FPC board 61 are connected to the electrical connections provided in the front and back, in the direction of the optical axis A, of the shake-prevention lens L3 and the support unit. The FPC board 61 is mounted to pinch the support unit. Accordingly, the support unit, including the shake-prevention mechanism and the shake-prevention lens L3 can be assembled simply, and electrical wiring can be achieved accurately and simply in the required state. Assembly is also easy and costs can be reduced because only one FPC board 61 is used. In addition, it is advantageous to position this single FPC board 61 by simply running the board along the optical axis because the lens barrel 1A and the camera body 1 itself can be made more compact.

In particular, with the present invention, by connecting various connection ends 61a–61d of the single FPC board 61 to the electrical connections of the first and second motors 21X and 21Y and the two pairs of photo-interrupters 32Xa, 32Xb, 32Ya and 32Yb, the wiring connections of each component can be attained in the required state using the FPC board 61. This is beneficial in terms of ease of assembly and cost and in addition, is easy and appropriates P0 from the standpoint of attaching the support unit of the shake-prevention mechanism prior to wiring.

The present invention is not limited to the above-described embodiment, but the shape and structure of each component of the lens barrel 1A and the camera body 1 can be changed and altered as appropriate.

For example, one example of the shake-prevention mechanism (shake correction device 100) has been shown, but this is intended to be illustrative and not limiting, for the same results can be obtained by applying the present invention to a shake-prevention mechanism having the well-known conventional structure. The only requirement is that the unit must have electrical connections provided in the front and back.

In addition, with the above-described embodiment, an example was described wherein a single FPC board 61 was used as the wiring device in the shake-prevention mechanism of the present invention, but this is intended to be illustrative, not limiting. The present invention can be applied to any such device with the same results as long as the device is a support unit that supports the other lens groups L1, L2 and L3, which are supported so as to be capable of movement in the lens barrel 1A, contains various electrical mechanisms, and has electrical connections provided on the front and back in the direction of the optical axis that can be wired simultaneously.

As explained above, a lens barrel according to the present invention is a device comprised of an optical system that comprises at least part of the main optical system, a support unit that supports this optical system, an electrical mechanism provided within the support unit that has electrical connections both to the front and the back in the direction of the optical axis in the support unit, and a wiring device that is connected to the various electrical connections in this electrical mechanism and is used to connect the connections to the outside. The FPC board having connecting ends to connect to the various electrical connections is used as the wiring device, and the connecting ends of the flexible printed circuit board are mounted to pinch the support unit that contains the electrical mechanisms from both the front and back in the direction of the optical axis. Because of this, the following results can be attained despite the simplicity of the structure.

1. Because the wiring device for the electrical connections in the front and back is comprised of a single FPC board rather than having the conventional divided structure, assembly is easy and assembly costs can be reduced.

2. Because the electrical connections in the front and back of the support unit, which support the optical system, can be connected by a single FPC board, costs can be reduced.

3. Because the FPC board is attached in a configuration wherein the board surrounds the support unit from the outside the support unit that supports the optical system, assembly is easy and assembly costs can be reduced. In particular, with this type of structure, after all mechanisms have been attached to the support unit, the FPC board can then be attached, which is a large benefit in terms of ease of assembly and in terms of cost.

4. Because a single FPC board can be attached so as to surround the support unit and pinch the support unit from the front and back, it is possible to provide a single accumulation of wiring along the optical axis, thereby reducing the space needed for wiring and enabling the lens barrel and camera to be made more compact.

In addition, with the lens barrel 1A of the present invention, various connections provided on a single FPC board 61 are connected to the electrical connections provide(P9 in the direction of the optical axis of the shake-prevention lens L3 and the support unit, and the FPC board 61 is mounted to pinch the support unit. Accordingly, the support unit (including the shake-prevention lens L3) can be assembled simply, electrical wiring can be achieved accurately and simply in the required state, and assembly is easy and costs can be reduced because only one FPC board 61 is used. In addition, it is advantageous to position the single FPC board 61 by simply running the board along the optical axis because the lens barrel 1A and the camera body 1 itself can be made more compact.

In particular, with the present invention, by connecting various connection ends 61a–61d of the single FPC board 61 to the electrical connections of the first and second motors 21X and 21Y and the two pairs of photo-interrupters 32Xa, 32Xb, 32Ya and 32Yb, the wiring connections of each component can be attained in the required state using the FPC board 61. This is beneficial in terms of ease of assembly and cost, and in addition, is easy and appropriate from the standpoint of attaching the support unit of the shake-prevention mechanism prior to wiring.

Figure 7:
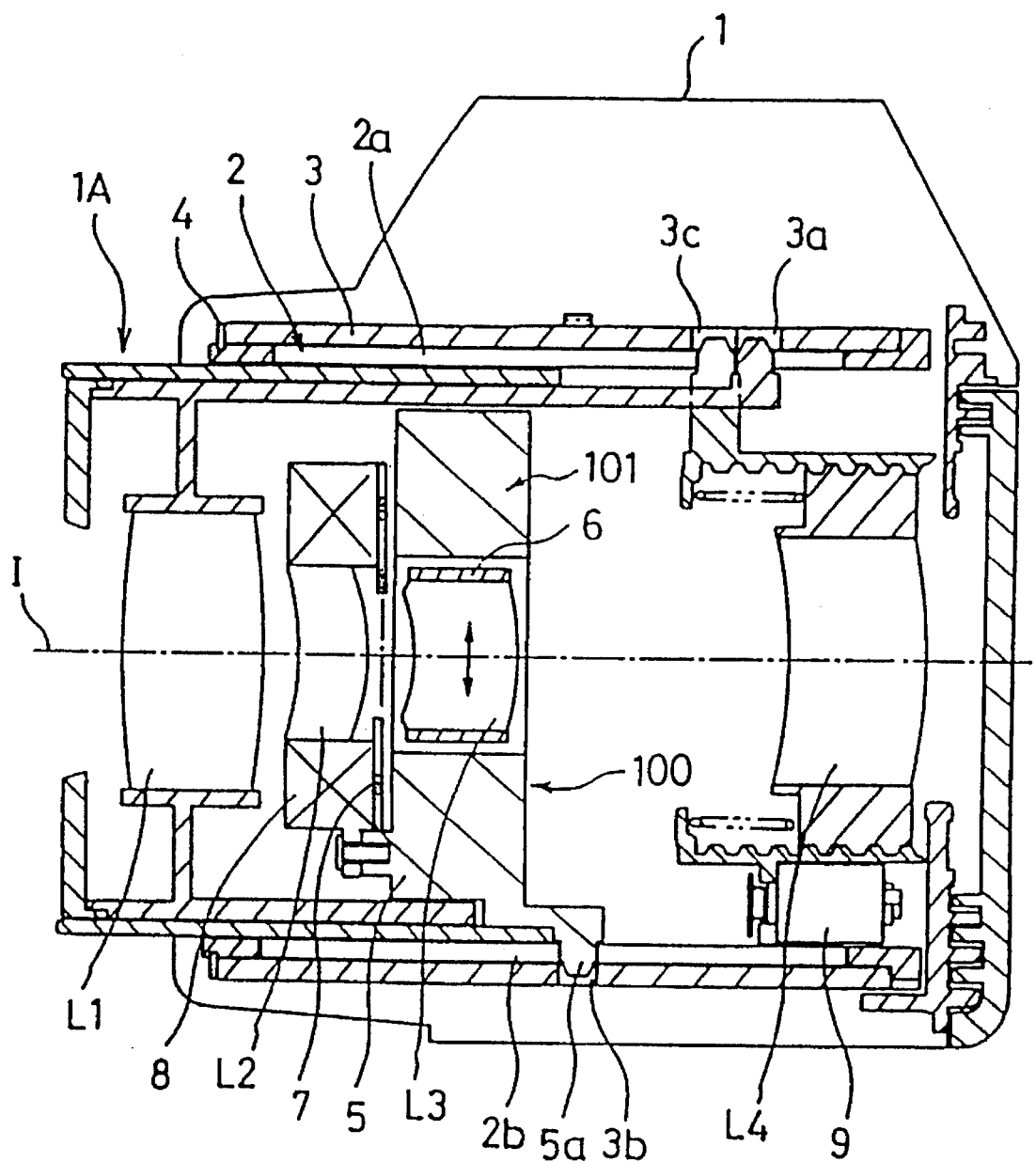
FIG. 7 is a perspective cross-sectional view of the camera as a whole in the state where the lens barrel is at the wide-angle position in an embodiment of a lens barrel according to the present invention.

FIGS. 5A–13 show a second embodiment of the lens barrel according to the present invention, in which case the present invention is applied to a camera in which the lens barrel is integrally attached (a zoom camera), as shown in FIG. 7.

FIG. 7 shows the state wherein the amount of protrusion of the lens barrel 1A from the camera body 1 at the time of photography is at a minimum, i.e. the socalled wide-angle position, the lens barrel 1A being capable of moving to the telephoto position by protruding toward the front of the camera body 1 in a well-known manner, but not represented in FIG. 7.

First, the basic structure of the camera body will be explained with reference to FIG. 7. A fixed lens barrel 2 is attached to the camera body 1 and comprises the lens barrel 1A that supports the zoom lens. Linear grooves 2a and 2b are formed in the direction of the optical axis along the circumference of the fixed lens barrel 2. In addition, a cam barrel 3 is mounted so as to be capable of rotation on the outer circumference of the fixed lens barrel 2 and is anchored by a ring 4. Cam grooves 3a, 3b and 3c are formed along the circumference of the cam barrel 3.

Furthermore, lens groups L1, L2, L3 and L4 are supported in the desired state as the optical system, which comprises the shooting optical system inside the cam barrel 11 and the fixed lens barrel 12.

Of these lens groups, L3 is the lens group that is the shake-prevention optical system (hereinafter referred to as the shake-prevention lens). This lens group is controlled by signals from an controller (not shown) so as to shift in a direction perpendicular to the optical axis I in order to prevent shaking.

In addition, lens groups L1, L2 and L3 are zooming lenses, while lens group L4 is a focusing lens.

A base plate 5 (FIG. 8), which comprises a base unit in the support unit for the shake-prevention lens L3, is inserted on the inner circumference of the above-described fixed lens barrel 2. A shake correction device 100 (refer to FIGS. 5A and B and 9–13), which comprises the shake-prevention mechanism, is attached to the base plate 5. A cam pin 5a is tied into the above-described linear groove 2b and cam groove 3b, through which the shake-prevention mechanism (shake correction device 100) is capable of moving in the direction of the optical axis.

The shake correction device 100 is composed of the shake-prevention lens group (hereinafter, the shake-prevention lens) L3 that is supported by the lens holder 6, and the shake correction drive mechanism 101 (refer to FIGS. 5A and B and 8–13) that drives the shake-prevention lens L3.

In FIG. 7, a lens shutter 8 is provided between lens groups L2 and L3, a lens shutter drive mechanism 8 is provided on the outer circumference of a lens frame (unrepresented) for the lens group L2, and focusing motor that effects focusing by causing the lens group L4 to advance and withdraw in the direction of the optical axis. A detailed explanation of these components is omitted.

The described drive mechanism 101 of the shake correction device 100 is shown in FIGS. 8–13, and in these drawings, the drive mechanism is composed of an X-direction drive mechanism 101X that drives the shake-prevention lens L3 in the X direction, and a Y-direction drive mechanism 101Y that drives the lens in the Y direction. Here, the X direction and the Y direction are directions that are botch perpendicular to the optical axis I of the shooting lens system.

Figure 8:
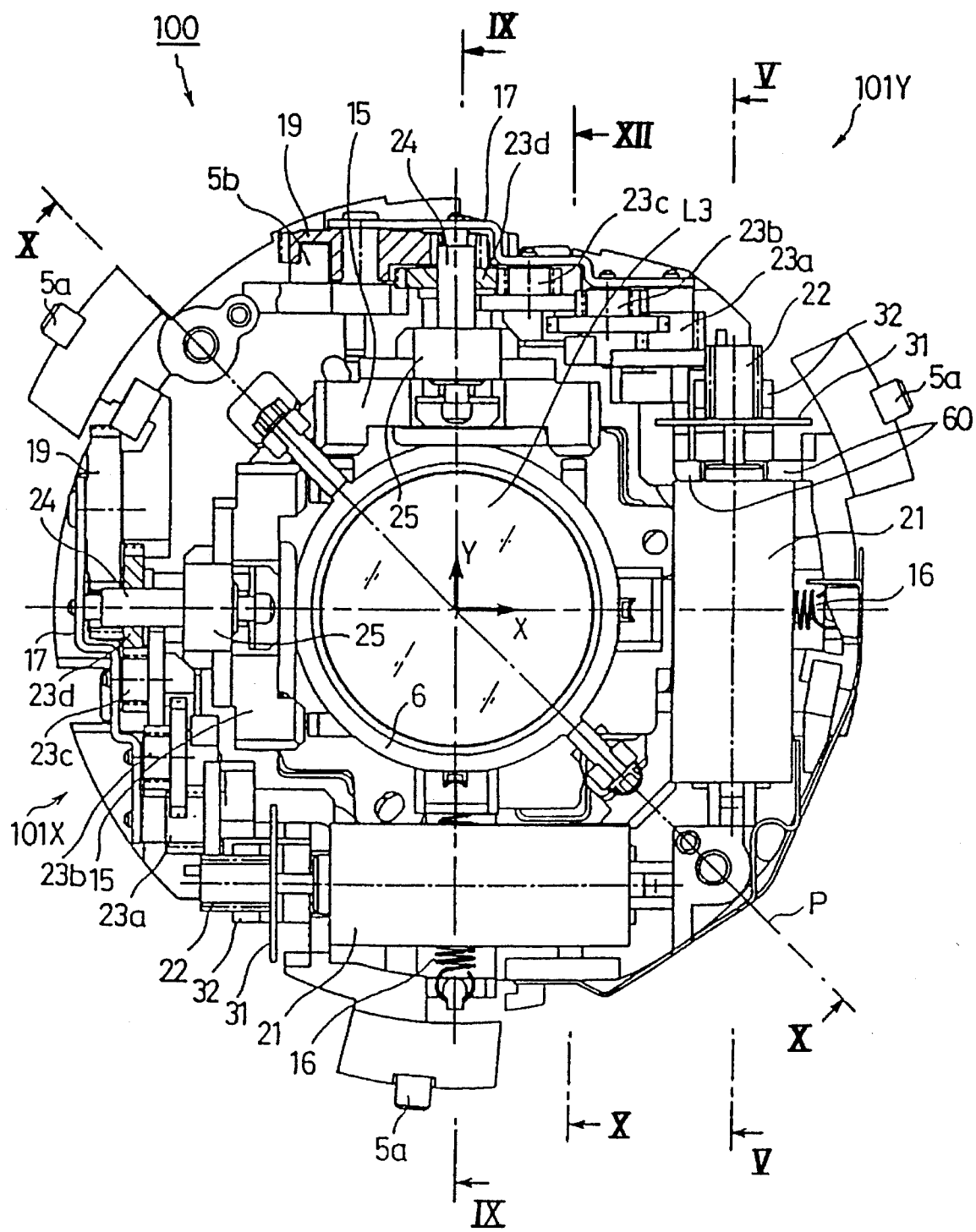
FIG. 8 is a side cross-sectional view showing components in the shake-prevention mechanism in an embodiment of a lens barrel according to the present invention.

The drive mechanisms 101X and 101Y in the X and Y directions are positioned symmetrically relative to the dashed line P in FIG. 8, and because driving in the X direction and driving in the Y direction are the same, an explanation will be provided hereafter only of driving in the Y direction.

The Y-direction drive mechanism 101Y of the drive mechanism 101 is provided with a Y-direction motor 21, a gear 22 that rotates as an integral unit with the output shaft of the motor 21, a reduction gear train 23 (23*a*, 23*b*, 23*c* and 23*d*) that reduces the rotation of gear 22, a Y-direction shift drive shaft 23 that includes a feed screw linked to the gear train 23, and a Y-direction drive arm 25 comprising a nut used to convert the rotation of the drive shaft 24 to linear movement through the meshing of a female component with a male component. The gear train 23 in this kind of drive mechanism 101Y is apparent from FIGS. 8, 11 and 13.

Figure 9:
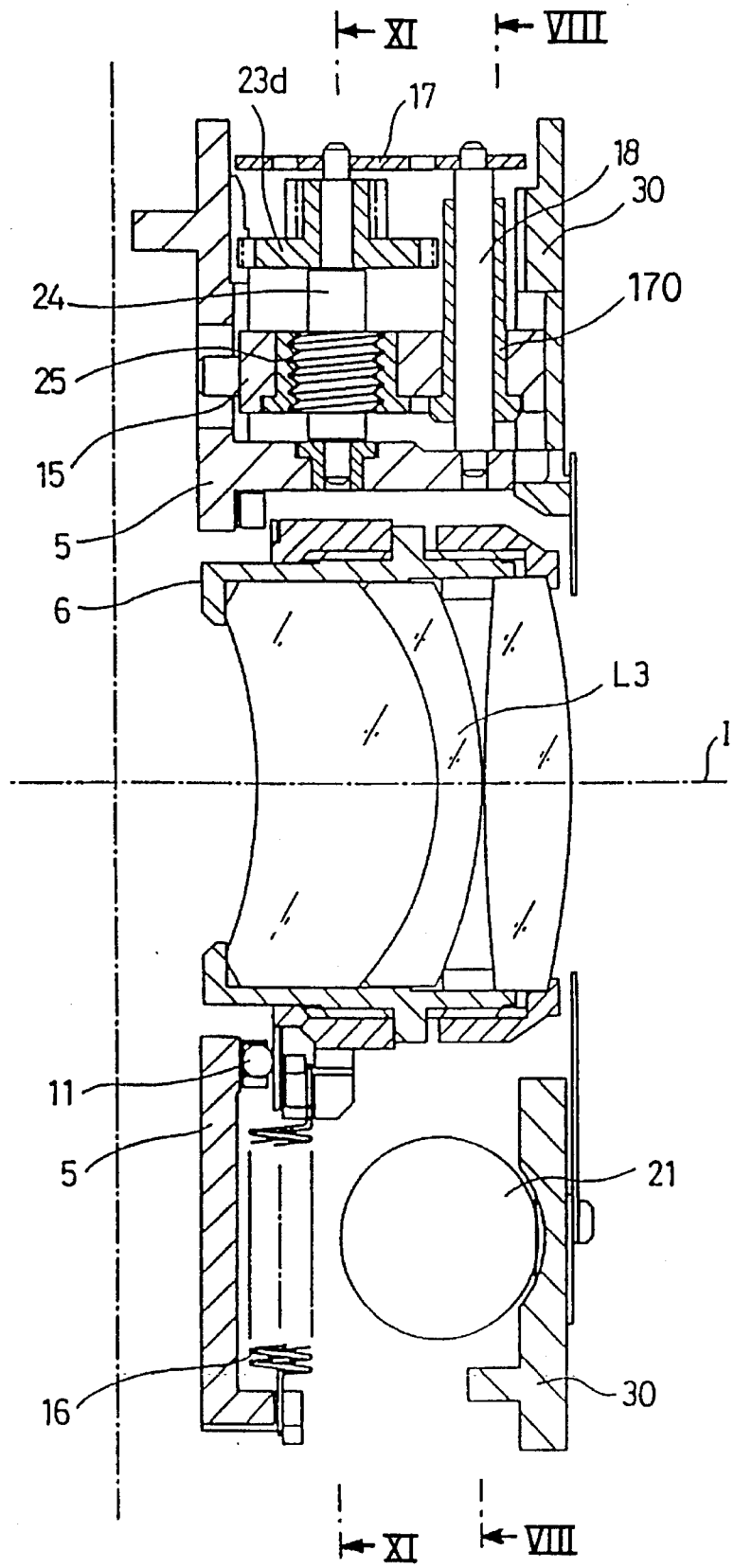
FIG. 9 is a cross-section taken along the line IX—IX in FIG. 8.
Figure 12:
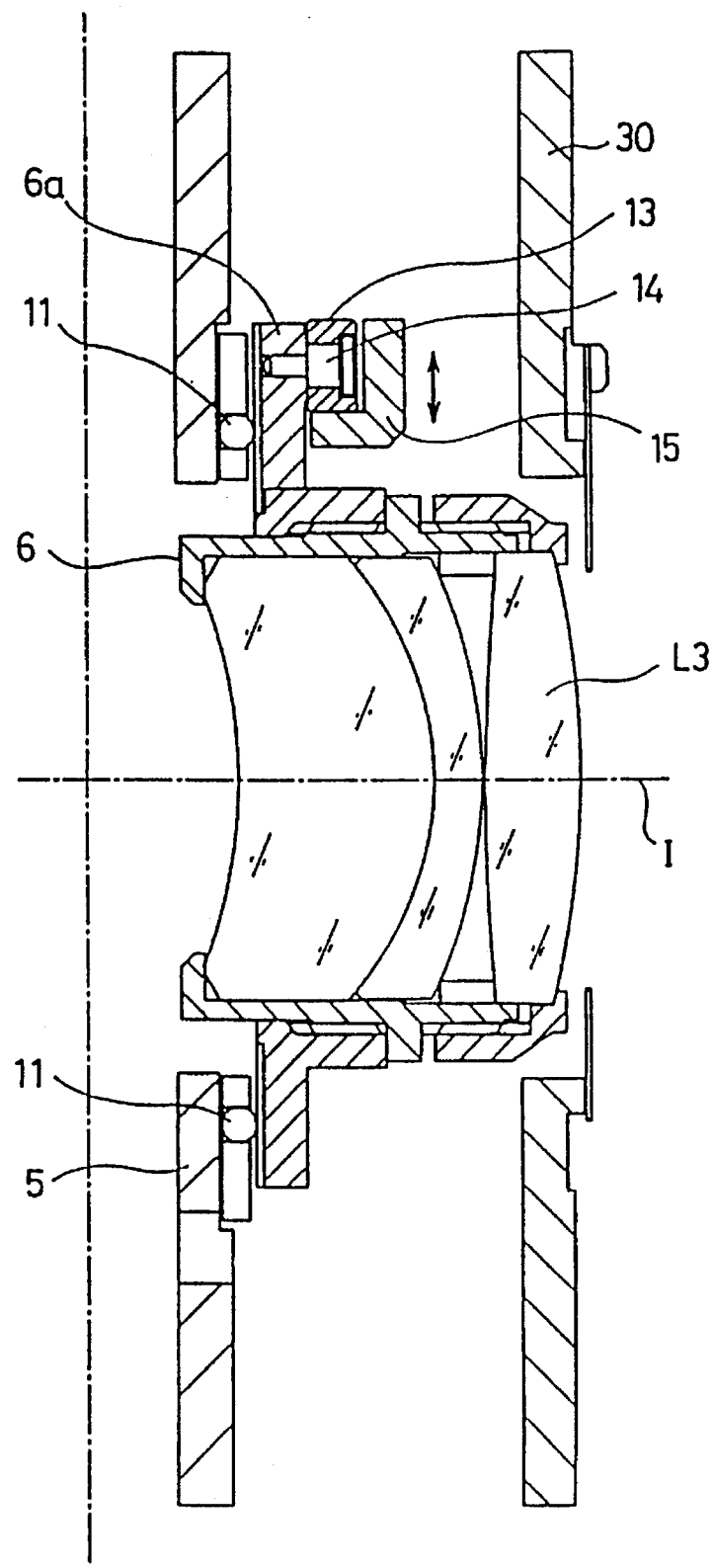
FIG. 12 is a cross-section taken along the line XII—XII in FIG. 8.
Figure 13:
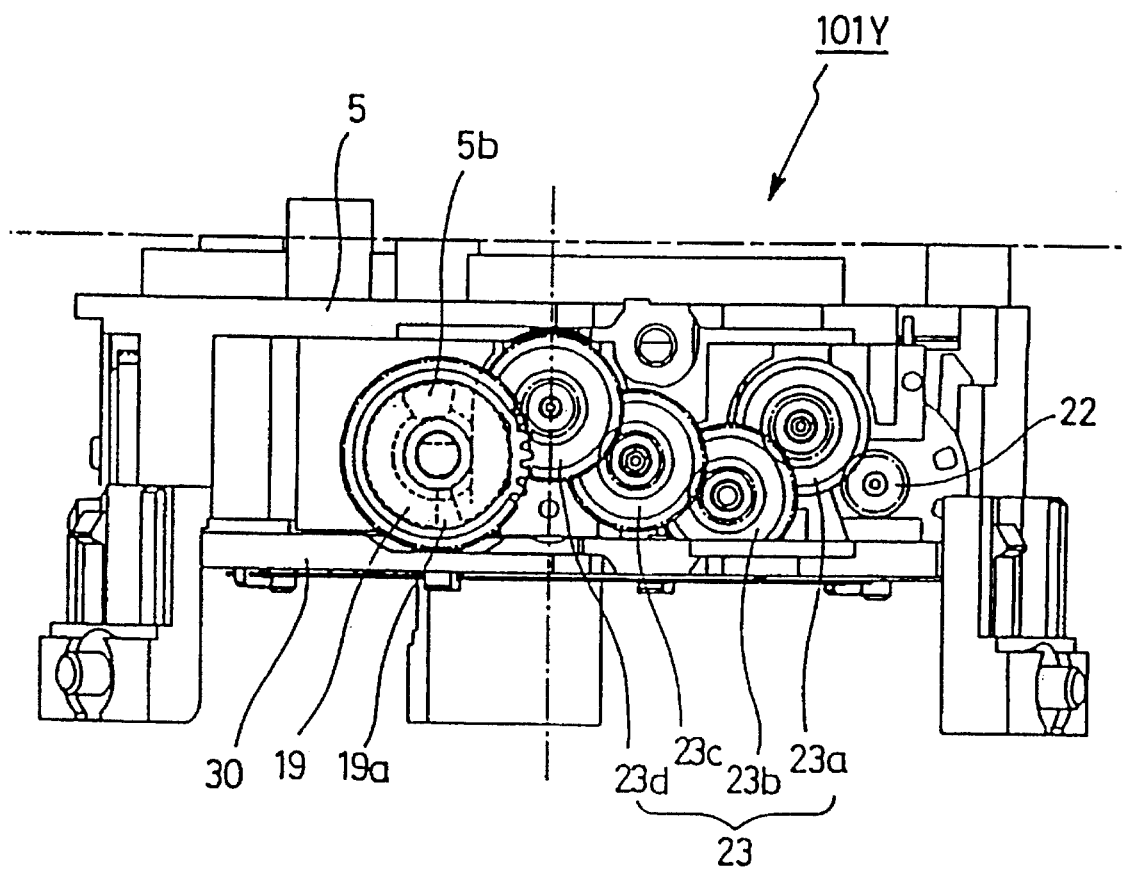
FIG. 13 is a summary planar view showing the gear train that transfers drive power from the power motor in the shake-prevention mechanism.

The lens frame 6 that supports the shake-prevention lens L3 is supported such that the flange 6*a* is free to move relative to the base plate 5 via a ball 11, as is clear from FIGS. 9 and 12. In FIG. 9, only one ball 11 is shown, but in actuality there are four positioned at locations having a separation of roughly 90°.

Figure 10:
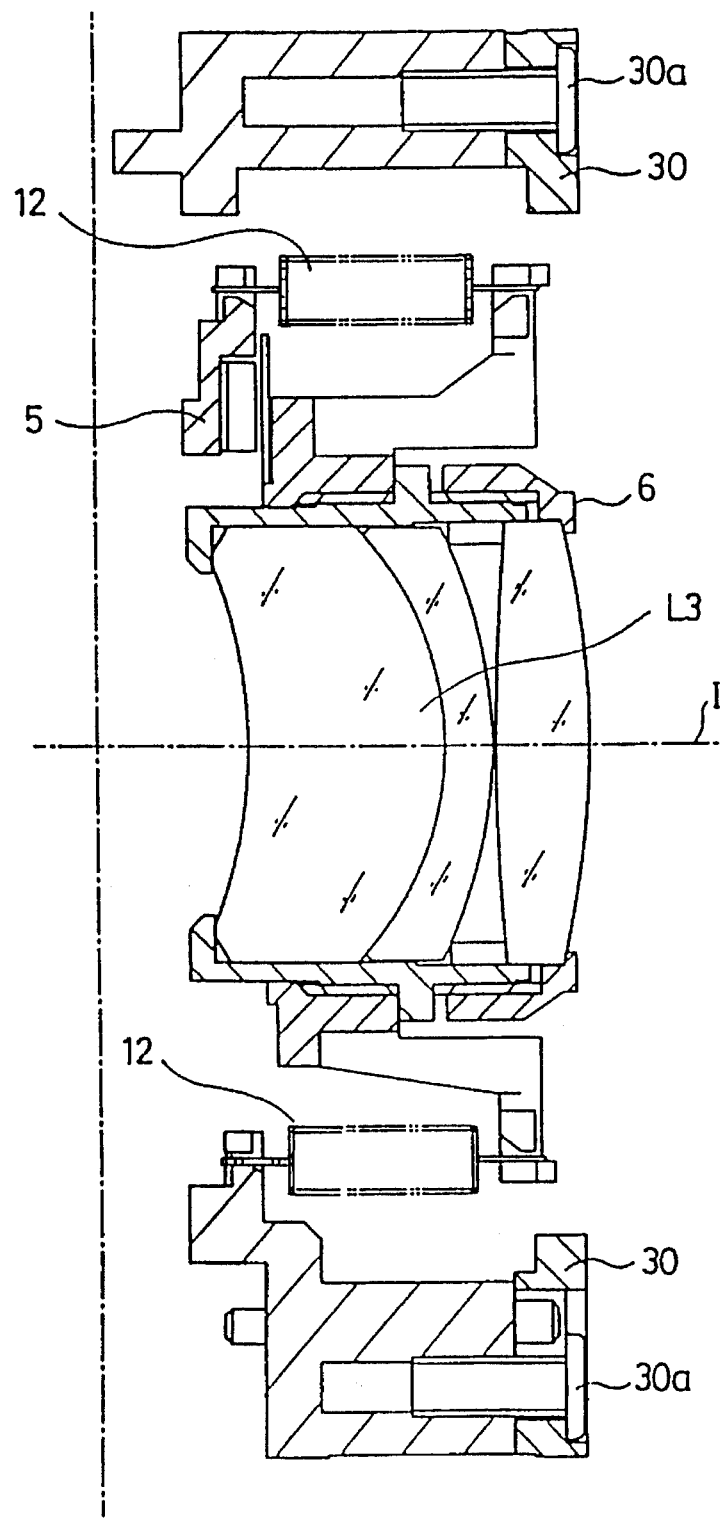
FIG. 10 is a cross-section taken along the line X—X in FIG. 8.

Furthermore, as shown in FIG. 10, the lens frame 6 is supported in a state such that the frame is forced toward the base plate 5 so as to pinch the balls 11, which comprise sliding elements, through the force of tension springs 12. Accordingly, the shake-prevention lens L3, which is supported by the lens frame 6, can move lightly and freely on the base plate 5 in a plane perpendicular to the optical axis I.

Figure 11:
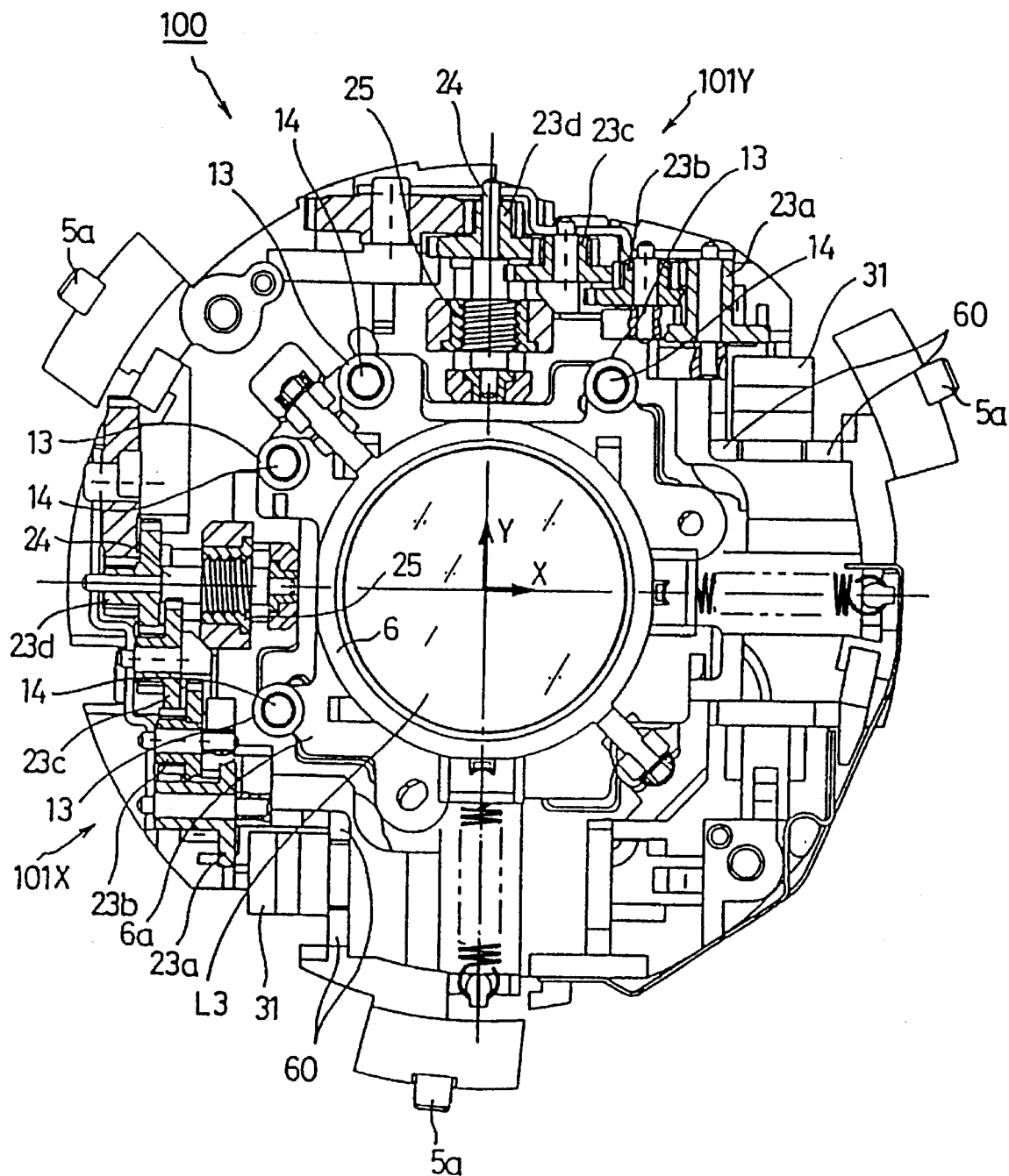
FIG. 11 is a cross-section taken along the line XI—XI in FIG. 9.

In addition, in the lens frame 6, a roller 13 is supported by a pin 14 so as to be capable of rotation, as shown in FIGS. 11 and 12. A shift unit 15, which can be moved in and out by the described screw mechanism in order to cause shifting of the lens frame 6, contacts roller 13, as is clear from FIGS. 9 and 12, so that shifting of the shake-prevention lens L3 is effected via the lens frame 6.

In other words, a wall provided in the shift unit 15 contacts the roller 13, and the lens frame 6 and the shake-prevention lens L3 shift in a direction perpendicular to the optical axis I through movement of the shift unit 15 in the up and down directions indicated by the arrows in FIG. 12. In addition, this lens frame 6 is forced by the spring 16 so that the rollers 13 are in good contact with the shift unit 15, as shown in FIG. 9. Accordingly, the lens frame 6 is driven by the shift unit 15 in the Y direction shown by the arrow in FIG. 12.

Movement in the X direction is enabled through the same structure, through which the lens frame 6 is enabled to shift in the required state. In addition, a guide barrel 170 is also provided in the described shift unit 15, as shown in FIG. 9, and is engagingly supported so as to be free to rub with a guide shaft 18 supported by a gear pressure plate 17 and a shaft support of the base plate 5. A female screw piece is also provided on the shift unit 15, the screw piece fitting together with the male screw piece of the described shift drive shaft 24 (which is the feed screw), and through this feed screw action, movement of the shift unit is effected. The rotation of the motor 21 is transferred to this shift drive mechanism 24 through the gear train 23.

A gear 19 comprises part of the described gear train 23 and includes a restriction gear that effects restriction of the amount of rotation by a protrusion 5*b* provided in the base plate 5 engaging with protrusion 19*a*. Through this, movement of the lens frame 6 is restricted within limits determined by the restriction gear 19. In addition, it is possible to know the standard position of the lens frame 6 at the position where the lens frame and the gear are in contact.

A cover unit 30 faces the base plate 5 with a predetermined spacing and is fixed in place by a screw 30*a*. The shake-prevention device 100 is composed by placing the various described components in the space thus formed with the base plate 5.

In addition, a disk 31, which is comprised of a light-shielding plate that is formed of a light-shielding component in which a plurality of holes are formed in concentric circles with a predetermined spacing between the holes along the circumference, is provided so as to rotate as an integral unit on the described gear 22 that rotates as an integral unit with the output shaft of the Y-direction motor 21, as is clear from FIG. 8. The same structure is present on the X-direction side.

Reference numbers 32*a* and 32*b* (and 33*a* and 33*b*) designate commonly-known photo-interrupters that have light-receiving units and light-emitting units that face each other and pinch or surround the disk 31 in which the holes are formed. The photo-interrupters comprise rotation detection sensors. The photo-interrupters 32*a*, 32*b* (and 33*a*, 33*b*) output a pulse signal each time a hole in the disks 31 on the X-direction side and Y-direction side is detected.

By counting the number of pulses, it is possible to detect the amount of rotation of the motor 21 (which depends on the amount of shifting of the shake-prevention lens L3), by which means the lens position can be detected. The reason two photo-interrupters 32*a*, 32*b* (and 33*a*, 33*b*) are used on each side is to detect the direction of rotation of the motor and the direction of movement of the shake-prevention lens L3 in addition to detecting the amount of rotation.

A flexible printed circuit board (FIG. 6) has connection ends 51*a* and 51*b* that are connected to terminals for the described motors 21 and the photo-interrupters 32*a*, 32*b*, 33*a* and 33*b*, and is connected by soldering to a control circuit (unrepresented) outside the lens barrel. Wiring board 50 pinches the components that comprise the shake-prevention device 100 in this embodiment from both sides in the direction of the optical axis and is provided in a state so as to surround the components from the outside. Accordingly, the board can be connected to the various connections and can effect electrical distribution.

The present invention is equipped with a cover unit 30 and a base plate 5 that supports the shake-prevention lens L3 that comprises at least part of the main optical system. An electrical drive mechanism 101 contains a motor 21 and a rotation transfer gear train 23 and is positioned between the base and cover. The electric drive mechanism 101 is attached to a pair of photo-interrupters 32a, 32b (33a, 33b) that act as rotation detection sensors to control the rotation of the motor 21. One of the photo-interrupters 32a, 32b (33a, 33b) in each pair is affixed to the base plate 5 that supports the motor 21, and the other photo-interruptor is fixed to the cover unit 30 that presses the motor 21.

With this structure, the mounting structure is improved when mounting the drive mechanism for the shake-prevention mechanism and the like in the lens barrel 1A, ease of assembly is increased and costs can also be reduced.

With this structure, the following results can be achieved.

Namely, assembly is improved because one of the photo-interrupters 32a, 32b, 33a and 33b in each pair is fixed to the cover unit 30 that presses the motor.

In addition, because the pairs of photo-interrupters 32a, 32b, 33a and 33b are fixed to separate units out of the base plate 5 and the cover unit 30, it is possible to remove the cover unit without removing the flexible printed circuit board 50 from the base plate 5. Accordingly, maintenance is easier, and ease of assembly is improved.

Furthermore, by separating the unit that supports the drive mechanism 101 into a base plate 5 and a cover unit 30, and by integrally attaching the base plates and the cover unit 30, at least the configuration of the base plate 5 or the configuration of the cover unit 30 to which the photo-interrupters 32a, 32b, 33a and 33b are attached does not become complicated. Consequently, when the base plate 5 and cover unit 30 are molded, the molding work does not become particularly complicated, and costs associated with the molding can be reduced.

The describe photo-interrupters 32a and 32b (33a and 33b) are positioned with a shift in the detection position in the direction of circumference relative to the disk 31, by which means detection of the direction of movement can be conducted with simplicity.

Figure 5B:
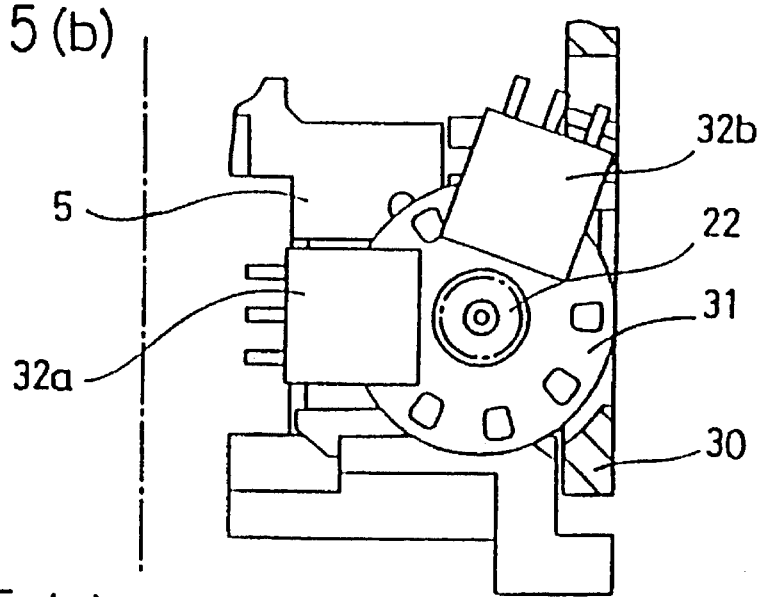
FIGS. 5A and 5B show an embodiment of a lens barrel according to the present invention, with FIG. 5A being a perspective cross-sectional view showing the components of the shake-prevention mechanism, and FIG. 5B being a perspective planar cross-sectional view of the same.
Figure 5A:
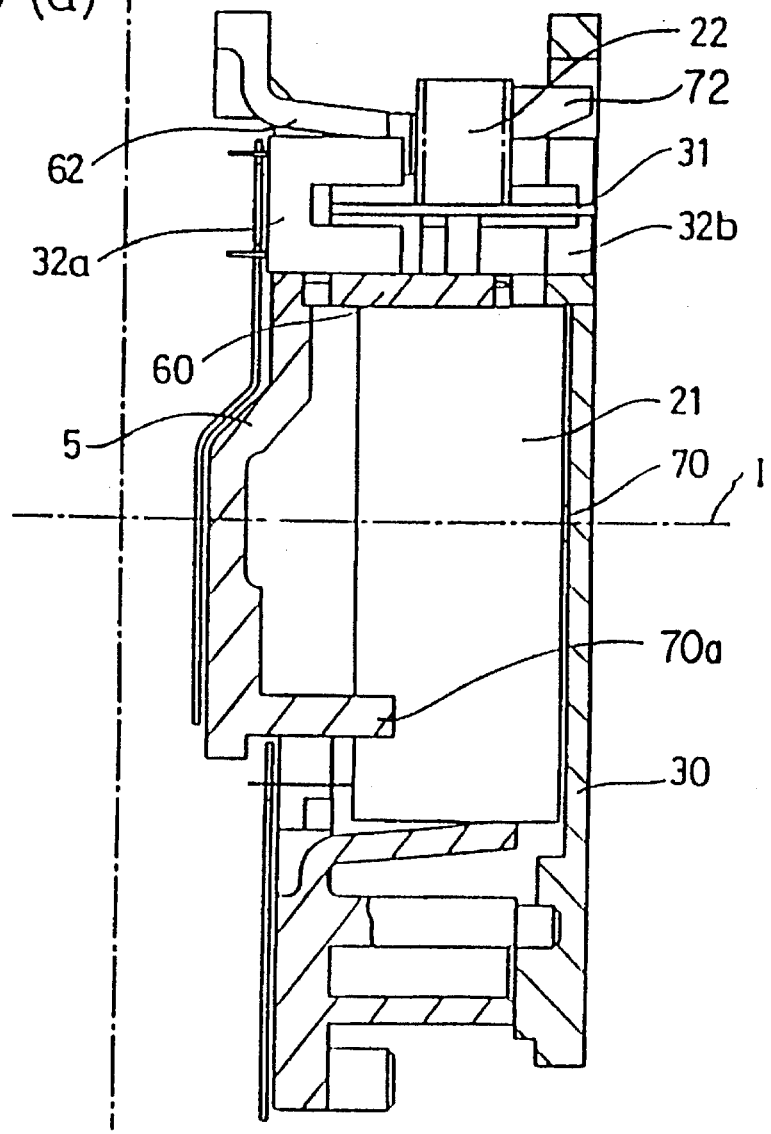
Figure 6:
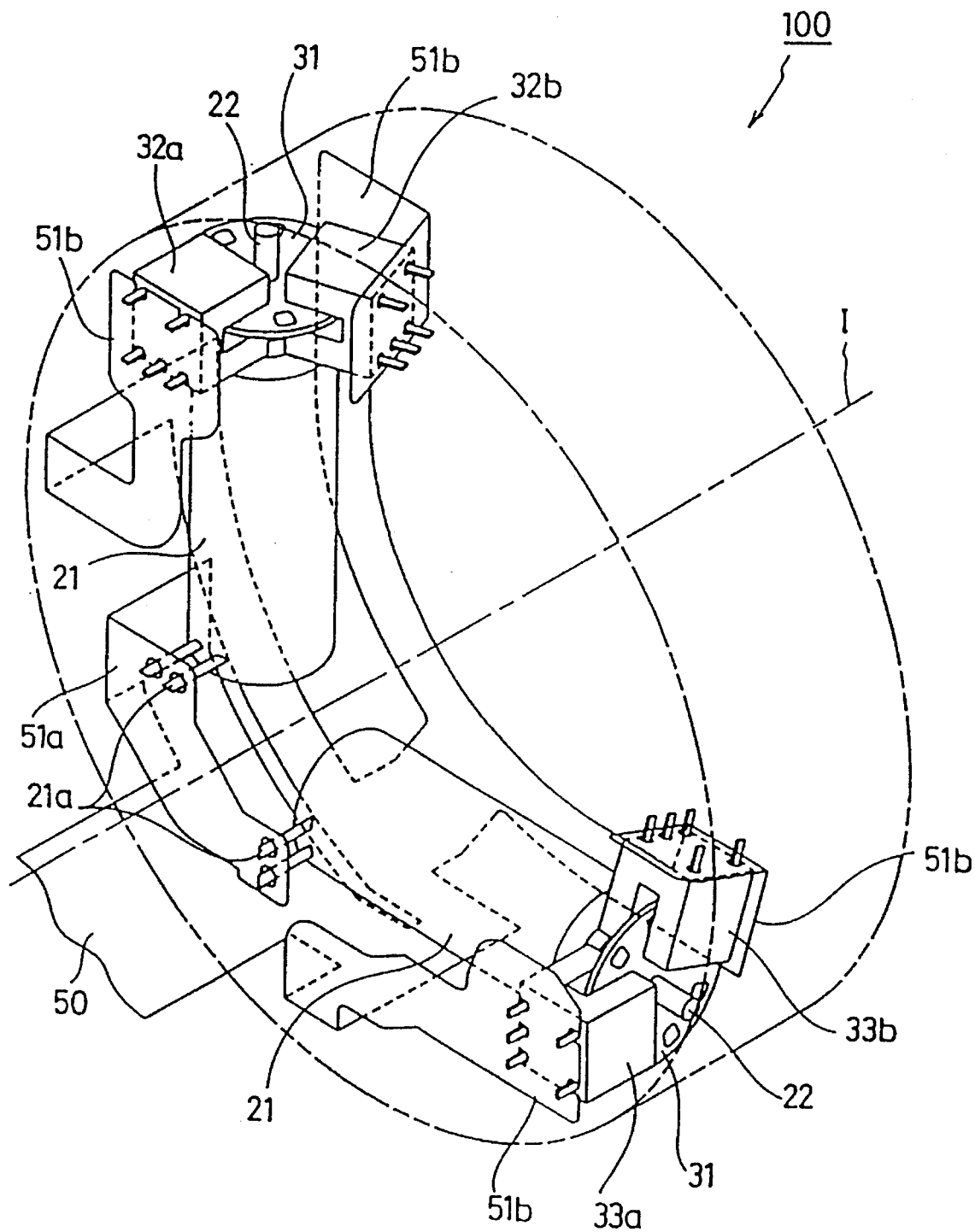
FIG. 6 shows the basic structure of a shake-prevention mechanism in an embodiment of a lens barrel according to the present invention.

In describing this structure, with the present embodiment, the position of the motor 21 is determined by a motor position determining unit 60, and the motor is supported by a motor receiving unit 70a, as is clear from FIGS. 5A and 5B. The motor 21 is fixed in place by a protrusion 70 provided on the cover unit 30 pressing on the motor 21. One of the photo-interrupters 32a and 33a, for example in each pair is attached to the base plate 5, while the other photo-interrupter 32b and 33b in each pair is attached to the cover unit 30.

For example, photo-interrupter 32a is supported on the base plate 5 by an arm unit 62, also provided on the base plate 5 as is clear from FIGS. 5a and 5b, while photo-interrupter 32b is supported on the cover unit 30 by an arm unit 72 provided on the cover unit 30.

The described embodiment is intended to be illustrative and not limiting, and variations in the shape and structure of the lens barrel 1A and camera body 1 will be apparent to those skilled in the art.

For example, the example presented includes a shake-prevention mechanism (shake correction device 100), but the present invention is not limited to this example as the same results can be achieved by applying the present invention to a shake-prevention mechanism having the conventional structure.

Furthermore, the present invention is not limited to a shake-prevention mechanism, but the same results can be achieved by applying the present invention to a system in which a motor and sensors to detect rotation of the motors, e.g. pairs of photo-interrupters, are supported as an electrical drive mechanism between a base unit and a cover unit that comprise a unit supporting the optical system.

In addition, with the described embodiment, the invention is applied to a camera in which the lens barrel is integrally attached, but this is intended to be illustrative and not limiting as the same results can obviously be achieved by applying the invention to a lens barrel in various types of cameras.

As explained above, the lens barrel according to this embodiment is equipped with an electrical drive mechanism containing a rotation transmission device and a drive motor positioned on a unit that supports at least part of the main optical system. A pair of rotation detection sensors are provided on the drive mechanism to control rotation of the motor and is affixed to separate units that comprise the drive mechanism. Because of this, the structure of the drive mechanism, which comprises the shake-prevention mechanism in the lens barrel, is improved, notwithstanding the simplicity of the structure, ease of assembly is improved, and costs can also be reduced.

In particular, the present embodiment utilizing the described structure yields the following benefits.

1. Because one photo-interrupter (rotation detection sensor) in each pair is attached to the cover unit that presses on the motor, ease of assembly is improved.

2. Because each photo-interrupter in the pair is attached to a separate unit, it is possible to remove the cover unit without removing the flexible printed circuit board from the base plate. Accordingly, maintenance is made easier and ease of assembly is improved.

3. Because the unit that supports the drive mechanism is divided into a base plate and a cover unit, at least the configuration of the base plate or the configuration of the cover unit to which the photo-interrupters are attached does not become complicated. Consequently when the base plate 5 and the cover unit 30 are molded, the molding work does not become particularly complicated, and costs associated with molding can be reduced.

With the lens barrel according to the present invention, by appling the described structure to a shake-prevention system equipped with a shake-prevention optical system and a drive mechanism including a motor that drives the optical system and a rotation transfer device, it is possible to effect even better results. In this case, the rotation detection sensors need only be fixed to separate units that comprise the drive mechanism.

Furthermore, it is also desirable to fix only one of the rotation detection sensors to the base unit that supports the motor and to fix the other to the cover unit that presses the motor.

In addition, with the lens barrel according to the present invention, the described results can be achieved using two photo-interrupters as the pair of rotation detection sensors and by providing the photo-interrupters in two different positions along the circumference of a light-shielding plate having light-shielding components at a predetermined spacing along the direction in which the plate is driven by the rotation of the motor.

A third embodiment of the invention will be described hereafter, with reference to FIGS. 14–20F.

Figure 14:
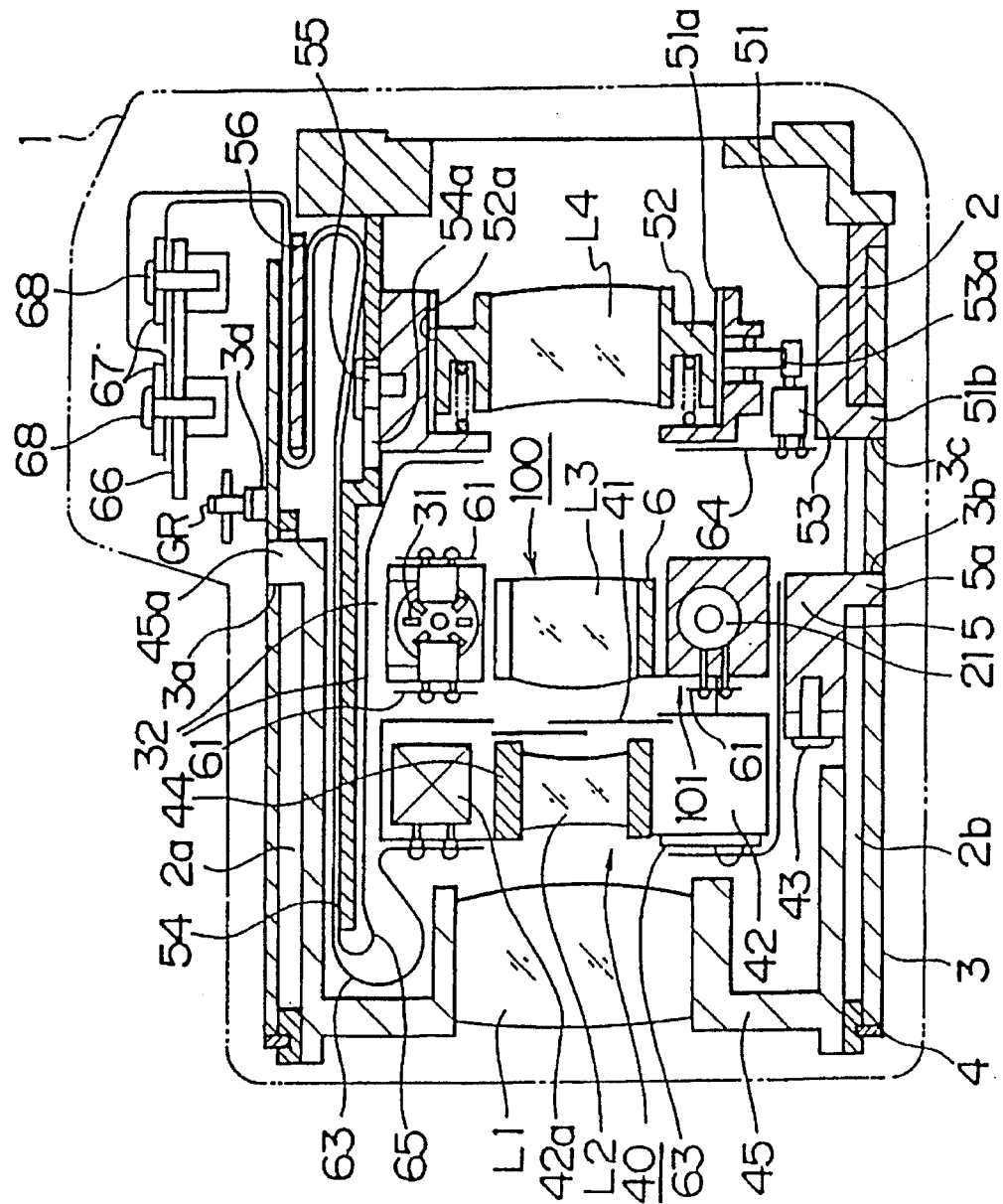
FIG. 14 is a side cross-section (condition in which the lens barrel is in the wide angle position) showing a lens barrel integrated camera (zoom camera) in the present invention.

FIGS. 14 and 15 illustrate a side cross-section of a lens barrel integrated camera (zoom camera) in the present embodiment, with FIG. 14 showing the lens barrel in the wide angle position and FIG. 15 showing the lens barrel in telephoto position.

A fixed barrel 2 is anchored on the camera body 1, and straight grooves 2a and 2b are formed in the direction of the optical axis on the surface of the fixed barrel 2. On the exterior surface of the fixed barrel 2, a cam cylinder 3 is fitted in such a way that the cam cylinder rotates freely with a ring 4 preventing the cam cylinder 3 from coming off of the fixed barrel. A gear unit 3d is formed on the exterior surface of the cam cylinder 3, the rotation of the zoom motor being transmitted to the gear unit 3d through the gear GR, causing the cam cylinder 3 to rotate. Moreover, cam grooves 3a, 3b and 3c are formed on the surface of the cam cylinder 3.

A lens circuit board base 5 is inserted along the interior surface of the fixed barrel 2, the lens circuit board base 5 holding the shake correction system 100 in place. The shake correction system 100 comprises a shake correction lens group L3 held by a lens holder 6 (hereafter referred to as an anti-vibration lens) and a driving mechanism 101, which drives the anti-vibration lens L3. The driving mechanism 101 (FIG. 4) comprises an X-direction driving mechanism 101X, which drives the anti-vibration lens L3 in the X-direction and a Y-direction driving mechanism 101Y, which drives the lens L3 in the Y-direction. Here, both the X-direction and the Y-direction are perpendicular to the optical axis of the photographic lens, as described above.

On the upper part of the driving shaft 24, the gear 24c meshes with the last gear of the deceleration gear train. A male screw component 24d is formed in the lower part of the driving shaft 24, the Y-direction driving arm 25 being held in the space formed in the circuit board 5 in such a way that the arm 25 moves freely vertically, but is not allowed to rotate in the space. The male screw component 24 is screwed into the female screw component 25a provided in the upper section of the driving arm 25.

In FIG. 14, a lens shutter mechanism 40 is attached to form one body with the shake correction system 100 whose structure is described above. In the lens shutter mechanism 40, a shutter blade 41, which also functions as a diaphragm, and a driving unit 42 to drive the shutter blade 41 are integrated as one body, the driving unit 42 being screwed onto the circuit board base 5 by means of a vise 43. Moreover, the electrical components 42a, such as a motor to drive the shutter blade 41, are mounted on the driving unit 42. In the internal surface of the driving unit 42, a lens group L2 is held by means of a lens holder 44. Here, a cam follower 5a provided on the circuit board base 5 penetrates through the linear groove 2b and is engaged in the cam groove 3b.

A lens holder 45 to hold a lens group L1 is inserted toward the tip of the fixed barrel 2, and the cam follower 45a provided in the outer surface of the lens holder 45 penetrates through the linear groove 2b and is engaged in the cam groove 3a.

A lens board 51 with a helicoid 51a provided on the internal surface is inserted toward the back of the fixed barrel 2, and a cam follower 51b provided on the outer surface of the lens board 51 penetrates through the linear groove 2b and is engaged in the cam groove 3c. A focusing lens L4 is held by a lens holder 52, and a helicoid 52a provided on the outer surface of the lens holder 52 is screwed into the helicoid 51a provided in the lens board 51 described above. A gear 53a integrated with the output shaft of a focusing motor 53 is screwed into the helicoid 51a, enabling rotation of the lens holder 52 with rotation of the motor 53. With rotation of the lens holder 52, the lens holder, or focusing lens L4 to be exact, moves along the optical axis due to the operation of the helicoid 51a and 52a, and the focusing operation is executed.

Here, the photo lens optical system is composed by each of lens groups L1–L4 as described above.

An FPC guide component 54 extends between the shake correction system 100, the lens shutter mechanism 40, and the lens holder 45 in the direction of the optical axis and is held by the camera body 1 in such a way that it slides in the direction of the optical axis. A long hole 54a is formed on the guide component 54 in the direction of the optical axis, a joggled vise 55 running through the hole and being screwed onto the lens board 51 described above. Thus, the lens board 51, guided by the long hole 54a, moves in the direction of the optical axis during zooming, as explained hereafter, and when the joggled vise 55 reaches the front edge of the long hole 54a, the lens board 51 and the guide component 54 begin moving together. An FPC guide component 56 is provided along the inner back surface of the cam barrel 3.

Figure 17:
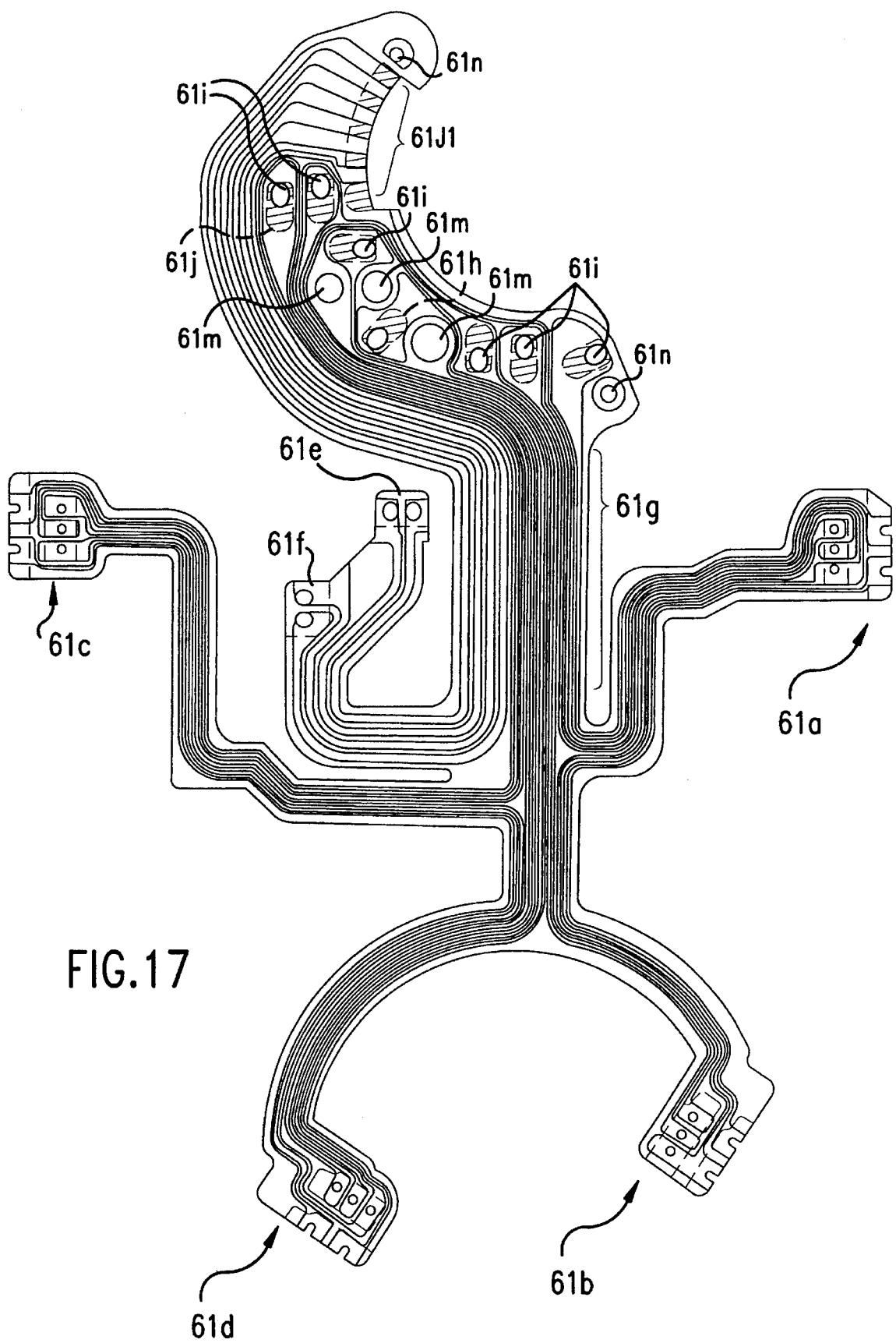
FIG. 17 is a developmental drawing showing the electrically conductive pattern surface of the anti-vibration FPC in the present invention.
Figure 18:
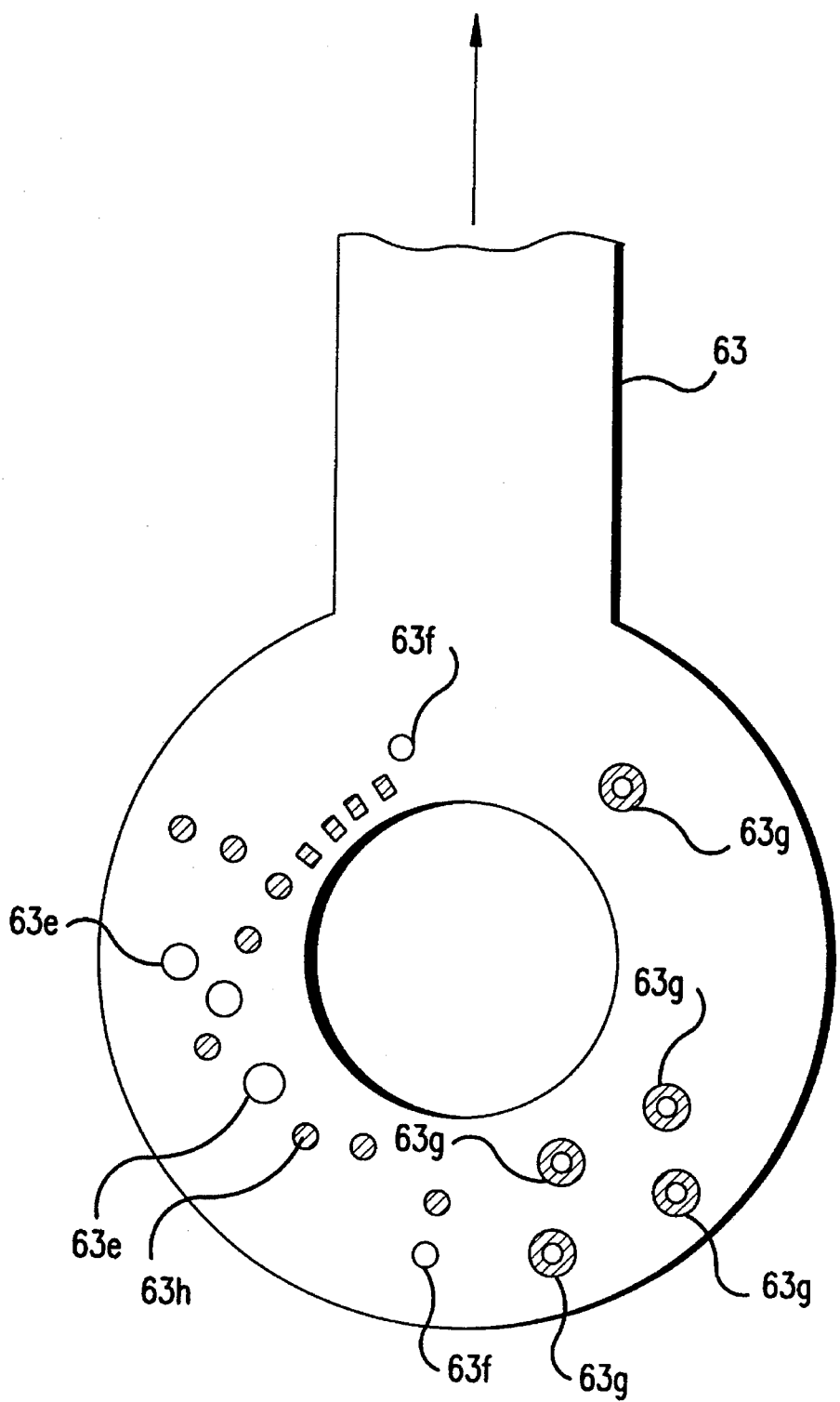
FIG. 18 is a top view showing the surface of the top section of the shutter FPC in the present invention.

An anti-vibration flexible printed circuit board (hereafter, anti-vibration FPC) 61 is a near circular ring shaped disk attached to the shake correction system 100 as described in FIGS. 1, 17 and 18. The electric components (X-, Y-direction motor 21X, 21Y and each photo interrupter) making up the shake correction system 100 are mounted on the anti-vibration FPC 61. The bottom section of the anti-vibration FPC 61 is pulled out through a hole section provided in the lens board base 5 along the optical axis toward the front of the camera and is soldered onto a shutter flexible printed circuit board (hereafter referred to as the shutter FPC) attached to the shutter mechanism 40 at the left side (front side) of FIG. 1, the electric component 42a inside the shutter driving unit 42 being soldered onto the shutter FPC 63.

In the left side (front side) of the lens board 51 in FIG. 14, a circular ring shaped mounting board 64 is attached as described with reference to FIGS. 14 and 15. A focusing motor 53 is soldered onto the mounting board 64. One edge of the focusing flexible printed circuit board (hereafter, focusing FPC) to connect the focusing motor 53 to the driver outside of the barrel is connected on the mounting board 64.

Figure 16:
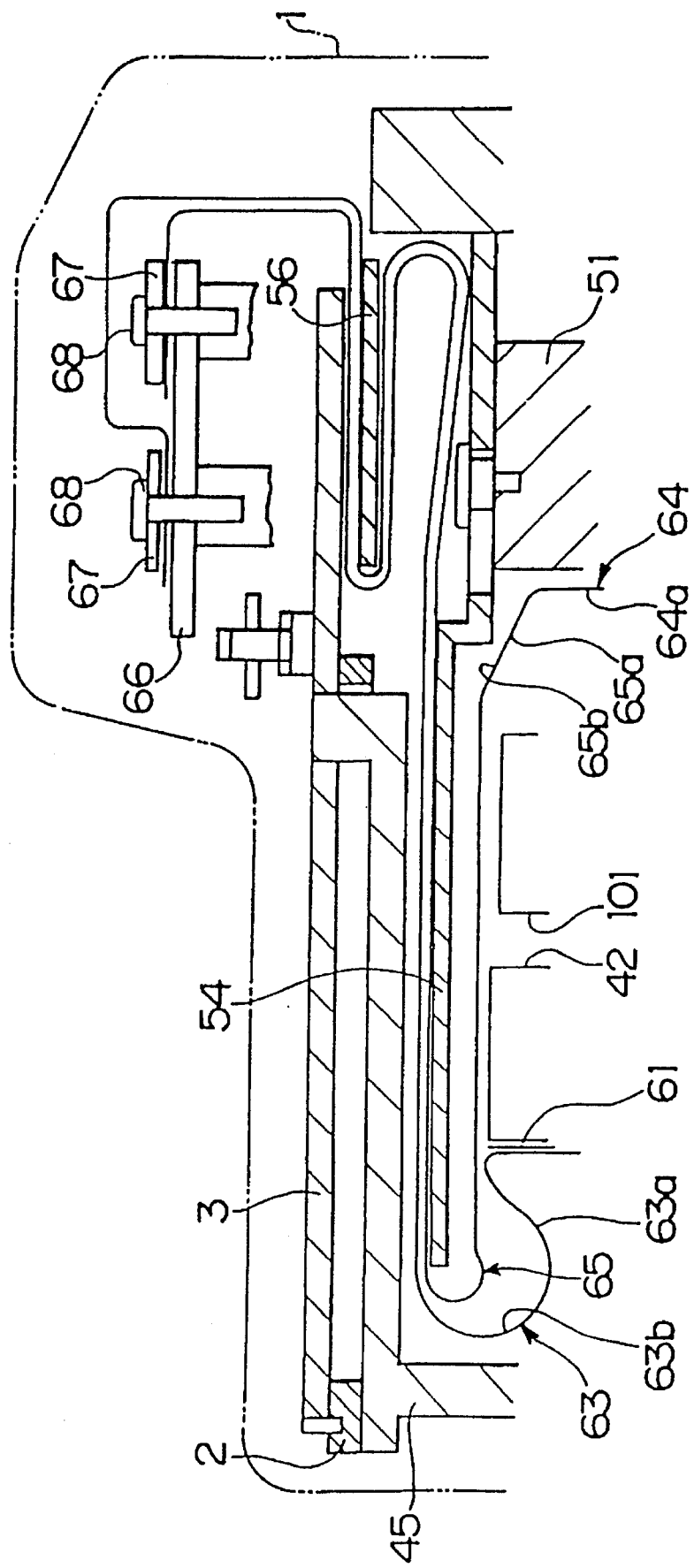
FIG. 16 is an enlarged drawing showing the FPC connection structure.

As illustrated in the enlarged drawing of FIG. 16, the focusing FPC 65 is pulled out through a space between the shake correction system, lens shutter mechanism 40 and the FPC guide component 54 and is bent backwards together with the shutter FPC 63. Here, an electricity conductive pattern is formed on the surface of the shutter FPC 63 and the focusing FPC 65 mentioned above. FPCs 63 and 65 are connected to the mounting board 64 and the anti-vibration FPC 61 so that the surfaces 63a and 65a on which the electricity conductive pattern is formed (cover-lay surface) face in the same direction as the soldered surface (left side) 64a of the mounting board 64 and the patterned surface of the anti-vibration FPC 61. Thus, each of FPCs 63 and 65 are laid together such that the cover-lay surface of FPC 65 and the back side of FPC 63 (surface without electricity conductive pattern; hereafter, base surface) are facing each other.

As illustrated in FIGS. 14 and 15, FPCs 63 and 65 are bent toward the back of the camera and pulled through the space between the FPC guide component 54 and the lens board 45 toward the back of the camera while being laid on top of each other, after which they are bent again toward the front of the camera and pulled through the space between the FPC guide component 56 and the cam barrel 3 on the top to the outside of the lens barrel. Finally, the tips of FPCs 63 and 65 are led to the top section of the camera body 1. The tips of FPCs 63 and 65 are press connected to the electric circuit board 66 anchored on the top section of the camera body 1 by means of the pressure board 67 and the installation vises 68.

The camera, in the present embodiment is structured in the manner described above, and when the cam barrel 3 is rotated through the gear GR, each of cam grooves 3a, 3b and 3c moves with the rotation of the cam barrel 3, which in turn drives the lens holder 45 and lens circuit boards 5 and 51 toward the optical axis through each of cam followers 45a, 5a and 53a. Thus, each of the lens groups L1–L4 is driven between the wide angle position illustrated in FIG. 14 and the telephoto position illustrated in FIG. 15, enabling a zooming motion. With this zooming motion, each of FPCs 63 and 65 deforms as needed, and an unreasonable load is not applied to lens groups L1–L4.

Next, a solder bridge section in the anti-vibration FPC 61 and the shutter FPC 63 will be described.

FIG. 17 is a developmental drawing describing the surface (electricity conductive pattern) of the anti-vibration FPC in the present embodiment. The anti-vibration FPC 61 comprises four connection terminals 61a–d where the photo interrupter 32 is soldered, connection terminals 61e and 61f where the motor 21 is soldered, a hole 61m to avoid partial protrusion of the driving component 42, a hole 61n to which the unrepresented position determining pin protruding from the lens shutter mechanism 40 is inserted, holes 61i for the solder bridge, an electricity conductive pattern 61j shown by the shaded area enclosed by dotted lines, and a linear section 61g.

FIG. 1 is an oblique view showing the details of an anti-vibration FPC attached to the shake correction system in the present embodiment. Only the parts relating to the anti-vibration FPC 61 are shown for clarity. Each connection terminal 61a–d is soldered such that four photo interrupters are pinched from front and back. The connection terminals 61e and f are soldered to the connector of the motor 21 from the front of the camera. Moreover, the linear section 61g of the anti-vibration FPC 61 goes through the bottom section of the camera and is bent at the front of the lens shutter mechanism 40 and solder bridged to the shutter FPC 63.

FIG. 18 is a top view showing the surface of the top section of the shutter FPC in the present embodiment. The top part of the shutter FPC 63 is in a circular ring shape and comprises a hole 63e to avoid protrusion of part of the driving unit 42, a position determining hole 63f, a hole 63g for soldering having an electricity conductive pattern section to be connected to the electric component 42a, and an electricity conductive pattern 63h shown by the shaded area.

The electricity conductive pattern 63h and the electricity conductive pattern for the hole 63g for soldering are not presented in the figure, but are connected to the electric circuit board 66 by an electricity conducting line formed on the shutter FPC 61.

Figure 19:
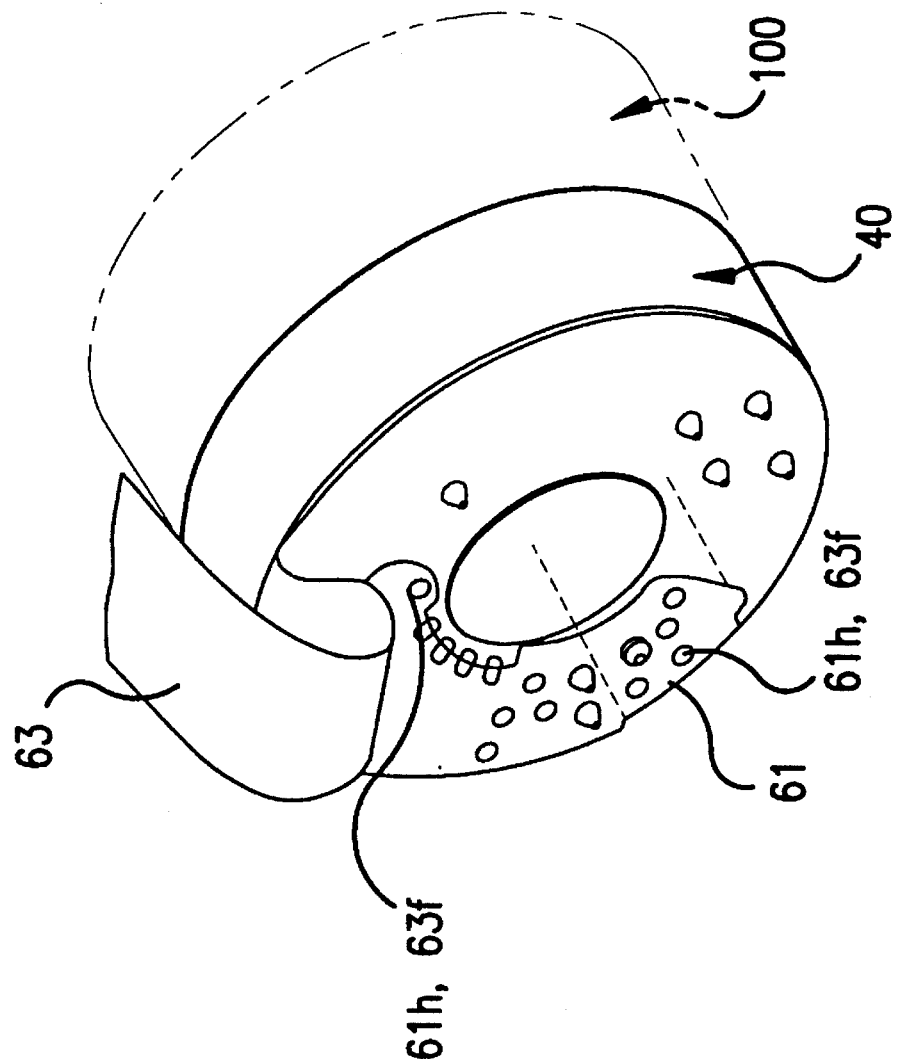
FIG. 19 is an oblique view of the shutter FPC and the anti-vibration FPC being solder bridged in the present invention.
Figure 20A:
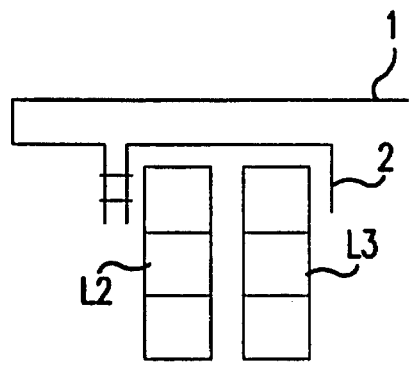
FIGS. 20A–20F are drawings showing other embodiments of the electrical circuit board connection structure of a camera in the present invention.
Figure 20E:
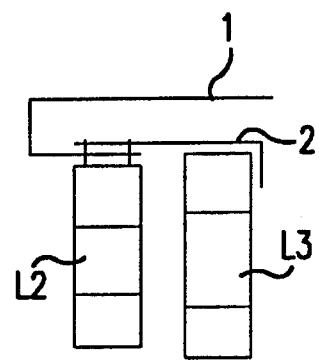
Figure 20B:
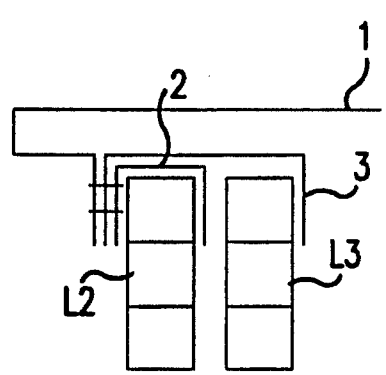
Figure 20F:
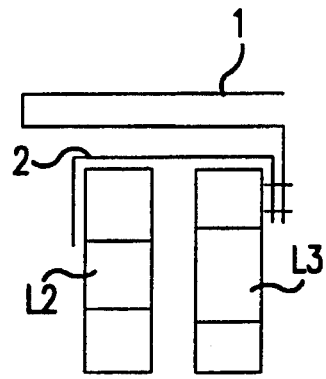
Figure 20C:
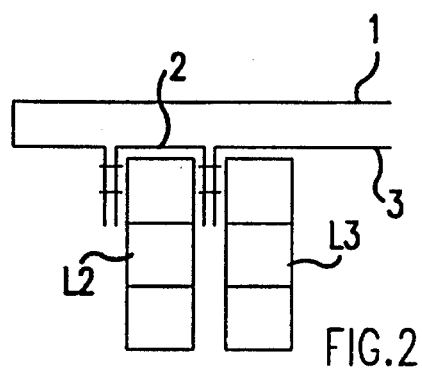
Figure 20D:
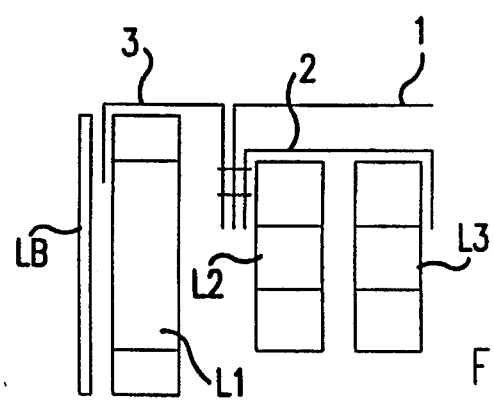

FIG. 19 is an oblique view showing the shutter FPC and the anti-vibration FPC being solder bridged in front of the lens shutter mechanism in the present embodiment with each FPC surface forming the front side. Positions of the shutter FPC 63 and the anti-vibration FPC are determined by position determining holes 63f and 61h, respectively, and anchored by the position determining pins (not shown). In this condition, the holes 61i are laid over the electricity conducting pattern 63h. Electricity conductive patterns 63h1 and 63h1 are placed on positions adjacent each other. Thus, electricity conductive patterns 61j and 63h are solder bridged on two FPCs 61 and 63, thus connecting the necessary lines to each other.

The present embodiment encompasses a variety of variations and modifications and is not limited to the embodiments described above. For example, in the above embodiment the first wiring board (1) and the second wiring board (2) are connected electrically in the vertical surface of the lens unit of the lens group L2, having the smallest diameter as illustrated in FIG. 20 (A), but the second wiring board (2) and the third wiring board (3) can be connected to the first wiring board (1) as illustrated in FIG. 20 (B).

Furthermore, the second and third wiring boards (2) and (3) can be connected in series as illustrated in FIG. 20 (C). The second and third wiring boards (2) and (3) are not limited for anti-vibration, lens shutter, and focusing uses but can be used for lens barrier LB use as illustrated in FIG. 20 (D), for example.

On the other hand, connection of the wiring boards (1), (2) and (3) to each other can be accomplished at any location, as long as it is in the vicinity of the lens unit, including on the circumference other than the vertical surface relative to the optical axis as illustrated in FIGS. 20 (E) and 20 (F). Furthermore, connections can be made in the vicinity of the lens unit of the lens group L3 with a relatively small diameter rather than the lens unit of the lens group L2 with the smallest diameter.

As explained in detail above, with the present embodiment, wiring boards are connected electrically to each other in the vicinity of the lens group having a smaller diameter among the multiplicity of lens groups, so wiring board space is not needed, thus realizing cameras that are more compact.

Moreover, in the vicinity of the lens having a smaller lens group, a surface perpendicular to the optical axis of the lens unit, for example, is utilized. Thus, use of a large flat space becomes possible, and a large number of connections are made possible and electrical connection work such as soldering becomes easy to perform due to the large flat space, resulting in an improvement of work efficiency.

While the invention has been described in conjunction with specified embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A lens barrel comprising:

an optical system including at least part of a main optical system;

a support unit that supports the main optical system;

an electrical mechanism positioned as part of the support unit, the electrical mechanism having electrical connections both to a front and a back in a direction of an optical axis of the support unit; and wiring structure for connecting the electrical connections in the electrical mechanism to external components, wherein the wiring structure includes a single flexible printed circuit board having connecting ends connected to the electrical connections, and wherein connecting ends of the single flexible printed circuit board are mounted to pinch the support unit that contains the electrical mechanism from both the front and the back in the direction of the optical axis.

2. A lens barrel comprising:

a shake-prevention optical system including at least part of a main optical system;

a support unit that supports the shake-prevention optical system;

a shake-prevention mechanism positioned as part of the support unit, said shake-prevention mechanism having electrical connections both to a front and a back in a direction of an optical axis of the support unit; and wiring structure for connecting the electrical connections in the shake-prevention mechanism to outside of the lens barrel, wherein said wiring structure includes a single flexible printed circuit board having connecting ends connected to the electrical connections, and wherein the connecting ends of the flexible printed circuit board are mounted to pinch the support unit that contains the shake-prevention mechanism from both the front and back in the direction of the optical axis.

3. The lens barrel of claim 2, wherein the shake-prevention mechanism comprises first and second drive means for driving the shake-prevention optical system in a first direction and a second direction, each of the first and :second drive means being equipped with a first motor and a second motor with an output shaft of each positioned substantially parallel to the first and second directions, respectively, wherein first and second light-shielding plates are provided one of directly and indirectly on the output shaft of each of the first and second motors to form a light-shielding unit with a spacing in a circumferential direction, and wherein two pairs of photo-interrupters are provided at two different positions facing each other along the direction of the circumference of each of the light-shielding units to detect the drive position of the shake-prevention optical system, the first and second motors and the electrical connections of the two pairs of photo-interrupters being provided on the front and back of the support unit in the direction of the optical axis, the single flexible printed circuit board being mounted to pinch the support unit from the front and the back.

4. A lens barrel comprising:

an electrical drive mechanism containing a rotation transmission device, the drive mechanism further comprising a drive motor positioned on a unit that supports at least part of a main optical system, wherein the drive mechanism is equipped with a pair of rotation detection sensors controlling rotation of the motor, the pair of rotation detection sensors being affixed to separate units that comprise the drive mechanism.

5. A lens barrel comprising:

a shake-prevention optical system that prevents shaking; and a drive mechanism containing a rotation transmission device and a power motor that drives the shake-prevention optical system, wherein the drive mechanism is equipped with a pair of rotation detection sensors used to detect the rotation of the power motor to conduct drive detection of the shake-prevention optical system, the pair of rotation detection sensors being affixed to separate units that comprise the drive mechanism.

6. The lens barrel of claim 5, further comprising a base unit and a cover unit oppositely integrally attached to each other with a spacing in the direction of an optical axis so that the drive mechanism can be positioned therebetween, wherein one of the pair of rotation detection sensors is fixed to the base unit that supports the power motor and the other of the pair of rotation detection sensors is fixed to the cover unit that presses the power motor.

7. The lens barrel of claim 5, wherein two photo-interrupters comprise the pair of rotation detection sensors, the photo-interrupters being located in two different positions along a circumference of a single light-shielding plate having a light-shielding unit at a spacing in a direction of the circumference, the light shielding plate being rotationally driven by rotation of the power motor.

8. A structure for a camera comprising:

a multiplicity of lens groups placed within a lens barrel;

a lens unit supporting each of the lens groups;

a first wiring board placed between the lens barrel and an electric circuit board provided in a camera body; and a second wiring board placed within the lens barrel, wherein the first wiring board and the second wiring board are connected in the vicinity of a lens group with a smaller diameter among the lens groups.

9. The structure of claim 8, wherein the first wiring board and the second wiring board are connected electrically in a surface perpendicular to an optical axis of the lens unit.

10. A structure for a camera comprising:

a multiplicity of lens groups placed within a lens barrel;

a lens unit for supporting each of the lens groups;

a first wiring board placed between the lens barrel and an electric circuit board provided in a camera body; and a second wiring board and a third wiring board placed within the lens barrel, wherein the second wiring board and the third wiring board are connected in the vicinity of a lens group with a smaller diameter among the lens groups.

11. The structure of claim 10, wherein the second wiring board and the third wiring board are connected electrically in a surface perpendicular to an optical axis of the lens unit.

12. A structure for a camera comprising:

an anti-vibration unit having anti-vibration lens groups within a lens barrel and electric parts;

a shutter unit integrated in a lens group with a smaller diameter than the diameters of the anti-vibration lens groups, wherein the shutter unit comprises electric parts;

a shutter wiring board connecting an electric circuit board provided in a camera body and the electric parts in the shutter unit; and an anti-vibration wiring board connecting the electric parts of the anti-vibration unit, wherein the shutter wiring board and the anti-vibration wiring board are connected electrically in a surface substantially perpendicular to an optical axis of the shutter unit.

13. An apparatus comprising:

an optical system;

a support unit that supports the optical system;

an electrical mechanism positioned as part of the support unit, the electrical mechanism having electrical connections both to a front and a back in a direction of an optical axis of the support unit; and wiring structure connecting the front and back electrical connections of the electrical mechanism to a control device, wherein the wiring structure includes a single flexible printed circuit board.

14. The apparatus of claim 13, wherein the flexible printed circuit board comprises connecting ends contacting the electrical connections of tile electrical mechanism.

15. The apparatus of claim 13, wherein the flexible printed circuit board pinches the support unit.

16. The apparatus of claim 13, further comprising means for moving the support unit.

17. The apparatus of claim 13, wherein the optical system comprises a shake-prevention optical system, and the electrical mechanism is a shake-prevention mechanism.

18. The apparatus of claim 13, wherein the flexible printed circuit board extends along the optical axis.

19. The apparatus of claim 13, wherein the electrical mechanism further comprises drive means and at least one sensor for detecting movement of the drive means.

20. An apparatus comprising:

an optical system support unit comprising a base unit and a cover unit; and an electrical drive mechanism supported between the base unit and the cover unit, said electrical drive mechanism comprising a plurality of sensors, wherein at least one of the sensors is affixed to the base unit and at least one other of the plurality of sensors is affixed to the cover unit.

21. An apparatus according to claim 20, wherein the base unit and the cover unit are separable.

22. An apparatus according to claim 20, wherein the base unit and cover unit are molded.

23. An apparatus according to claim 20, wherein the electrical drive mechanism comprises a motor.

24. An apparatus according to claim 23, wherein the cover unit includes means for pressing the motor.

25. An apparatus according to claim 20, further comprising a single flexible printed circuit board connected to the plurality of sensors.

26. An apparatus according to claim 25, wherein the single flexible printed circuit board pinches the electrical drive mechanism.

* * * * *